(12) United States Patent
Odauchi

(10) Patent No.: US 11,920,612 B2
(45) Date of Patent: Mar. 5, 2024

(54) ATTACHMENT STRUCTURE FOR ATTACHING FAN UNIT TO MAIN BODY OF ELECTRICAL EQUIPMENT, CONNECTOR CONNECTING MAIN BODY OF ELECTRICAL EQUIPMENT AND FAN UNIT, AND ELECTRICAL EQUIPMENT

(71) Applicant: Fanuc Corporation, Yamanashi (JP)

(72) Inventor: Shingo Odauchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 611 days.

(21) Appl. No.: 15/930,871

(22) Filed: May 13, 2020

(65) Prior Publication Data

US 2020/0370565 A1 Nov. 26, 2020

(30) Foreign Application Priority Data

May 21, 2019 (JP) ................................. 2019-095420

(51) Int. Cl.
*F04D 29/60* (2006.01)
*F04D 19/00* (2006.01)
(Continued)

(52) U.S. Cl.
CPC ......... *F04D 29/602* (2013.01); *F04D 19/002* (2013.01); *F04D 29/601* (2013.01); *H02K 5/225* (2013.01); *H02K 9/06* (2013.01)

(58) Field of Classification Search
CPC .... F04D 29/602; F04D 19/002; F04D 29/601; H02K 5/225; H02K 9/06; H05K 7/20136;
(Continued)

(56) References Cited

U.S. PATENT DOCUMENTS 7,626,818 B2 12/2009 Yoshida et al.
10,716,237 B2 * 7/2020 Kim ................... H05K 7/20909
(Continued)

FOREIGN PATENT DOCUMENTS

JP 05057994 A 3/1993
JP 2000299151 A 10/2000
(Continued)

OTHER PUBLICATIONS

Raw Machine translation of JP2005051085 (A)—Feb. 24, 2005; Title—"Air Cooling Fan Unit"; Hasegawa et al.*

*Primary Examiner* — Charles G Freay
*Assistant Examiner* — Lilya Pekarskaya
(74) *Attorney, Agent, or Firm* — Buchanan, Ingersoll & Rooney PC

(57) ABSTRACT

A attachment structure enabling more efficient work in performing maintenance of a fan of a fan unit and a more stable electrical connection between a main body of an electrical equipment and a fan unit. A attachment structure configured to detachably attach a fan unit including a fan and a casing housing the fan to/from a main body of an electrical equipment includes a guide mechanism configured to guide a slide motion of sliding the casing in one direction relative to the main body to dispose the casing at a mounting position, and a retaining mechanism configured to restrict movement of the casing relative to the main body in a direction opposite the one direction when the casing is disposed at the mounting position by the slide motion.

7 Claims, 20 Drawing Sheets

(51) Int. Cl.
*H02K 5/22* (2006.01)
*H02K 9/06* (2006.01)

(58) Field of Classification Search
CPC .......... H05K 5/00; H05K 5/02; H05K 5/0217; H05K 5/0247
See application file for complete search history.

(56) References Cited

U.S. PATENT DOCUMENTS

| | | | |
|---|---|---|---|
| 2004/0145881 A1* | 7/2004 | Kosugi | F04D 29/703 361/810 |
| 2018/0213686 A1* | 7/2018 | Kim | H02P 27/06 |
| 2019/0312486 A1* | 10/2019 | Yamamoto | H02K 5/225 |

FOREIGN PATENT DOCUMENTS

| | | |
|---|---|---|
| JP | 2004235257 A | 8/2004 |
| JP | 2005051085 A | 2/2005 |
| JP | 2007325383 A | 12/2007 |
| JP | 2013008418 A | 1/2013 |

\* cited by examiner

ATTACHMENT STRUCTURE FOR ATTACHING FAN UNIT TO MAIN BODY OF ELECTRICAL EQUIPMENT, CONNECTOR CONNECTING MAIN BODY OF ELECTRICAL EQUIPMENT AND FAN UNIT, AND ELECTRICAL EQUIPMENT

CROSS-REFERENCE TO RELATED APPLICATIONS

This application is a new U.S. Patent Application that claims benefit of Japanese Patent Application No. 2019-095420, dated May 21, 2019, the disclosure of this application is being incorporated herein by reference in its entirety for all purposes.

BACKGROUND OF THE INVENTION

1. Field of the Invention

The present invention relates to an attachment structure for detachably attaching a fan unit to a main body of an electrical equipment, a connector connecting the main body of the electrical equipment and the fan unit, and an electrical equipment.

2. Description of the Related Art

There is known an attachment structure for detachably attaching a fan unit to a main body of an electrical equipment, and a connector connecting the main body of the electrical equipment and the fan unit (e.g., JP 2004-235257 A). In the related art, there is a need for more efficient work in performing maintenance of a fan of a fan unit and a more stable electrical connection between a main body of an electrical equipment and a fan unit.

SUMMARY OF THE INVENTION

In one aspect of the present disclosure, an attachment structure configured to detachably attach a fan unit to a main body of an electrical equipment, the fan unit including a fan and a casing configured to house the fan, the attachment structure comprising a guide mechanism configured to guide a slide motion of the casing in one direction relative to the main body to dispose the casing at a mounting position, and a retaining mechanism configured to restrict movement of the casing relative to the main body in a direction opposite the one direction when the casing is disposed at the mounting position by the slide motion.

According to an aspect of the present disclosure, an operator can easily detachably attach the fan unit to the main body along the one direction without using a fastener such as a bolt. Accordingly, the operator can easily perform maintenance of the fan even when the fan unit can only be accessed from one direction.

In addition, according to another aspect of the present disclosure, when vibration occurs in an electrical equipment in a state where a connector provided in one of a main body of the electrical equipment and a fan unit is connected to a counterpart connector provided in the other of the main body and the fan unit, it is possible to mitigate stress acting on a movable terminal portion and thus prevent wiring in the movable terminal portion from being disconnected.

DETAILED DESCRIPTION

Figure 1:
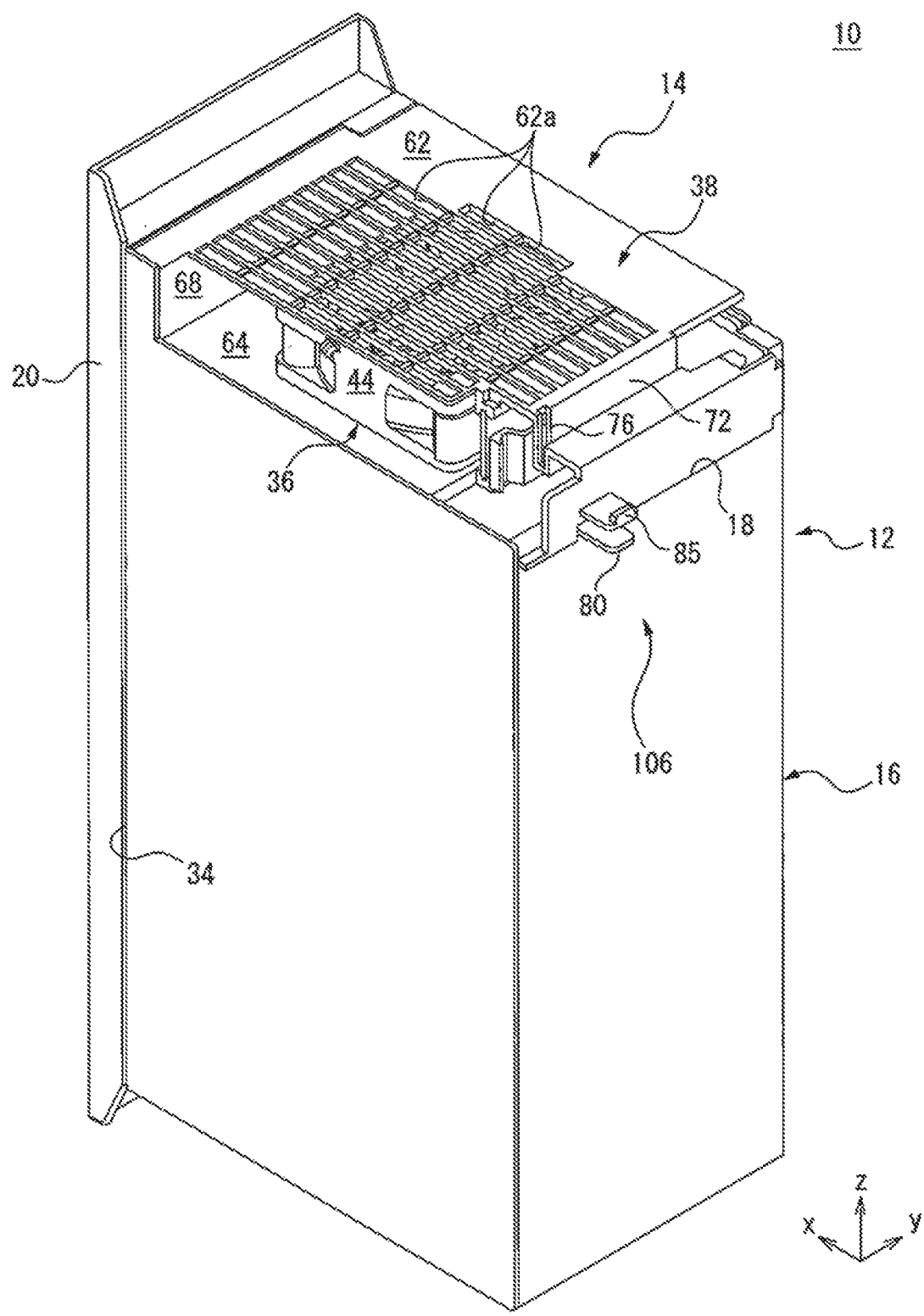
FIG. 1 is a perspective view of an electrical equipment according to an embodiment.

Embodiments of the present disclosure will be described below in detail with reference to the drawings. Note that, in the various embodiments described below, similar elements are denoted by the same reference numerals, and redundant descriptions thereof will be omitted. First, an electrical equipment 10 according to an embodiment will be described with reference to FIGS. 1 to 3. In the following description, the Cartesian coordinate system (x-axis, y-axis, and z-axis) illustrated in the drawings is used for reference of directions.

In the present embodiment, the electrical equipment 10 is a numerical control device configured to control a machine tool, or a motor drive device configured to supply power to a servomotor provided in a machine tool. The electrical equipment 10 includes a main body 12 and a fan unit 14. The main body 12 includes a housing 16, a bracket 20, a connector 22 (FIG. 2), and electronic components (not shown). The housing 16 is hollow and houses the electronic components. The electronic components include e.g. a processor (CPU, etc.), a storage unit (ROM, RAM, etc.), a circuit board, and an amplifier.

Figure 2:
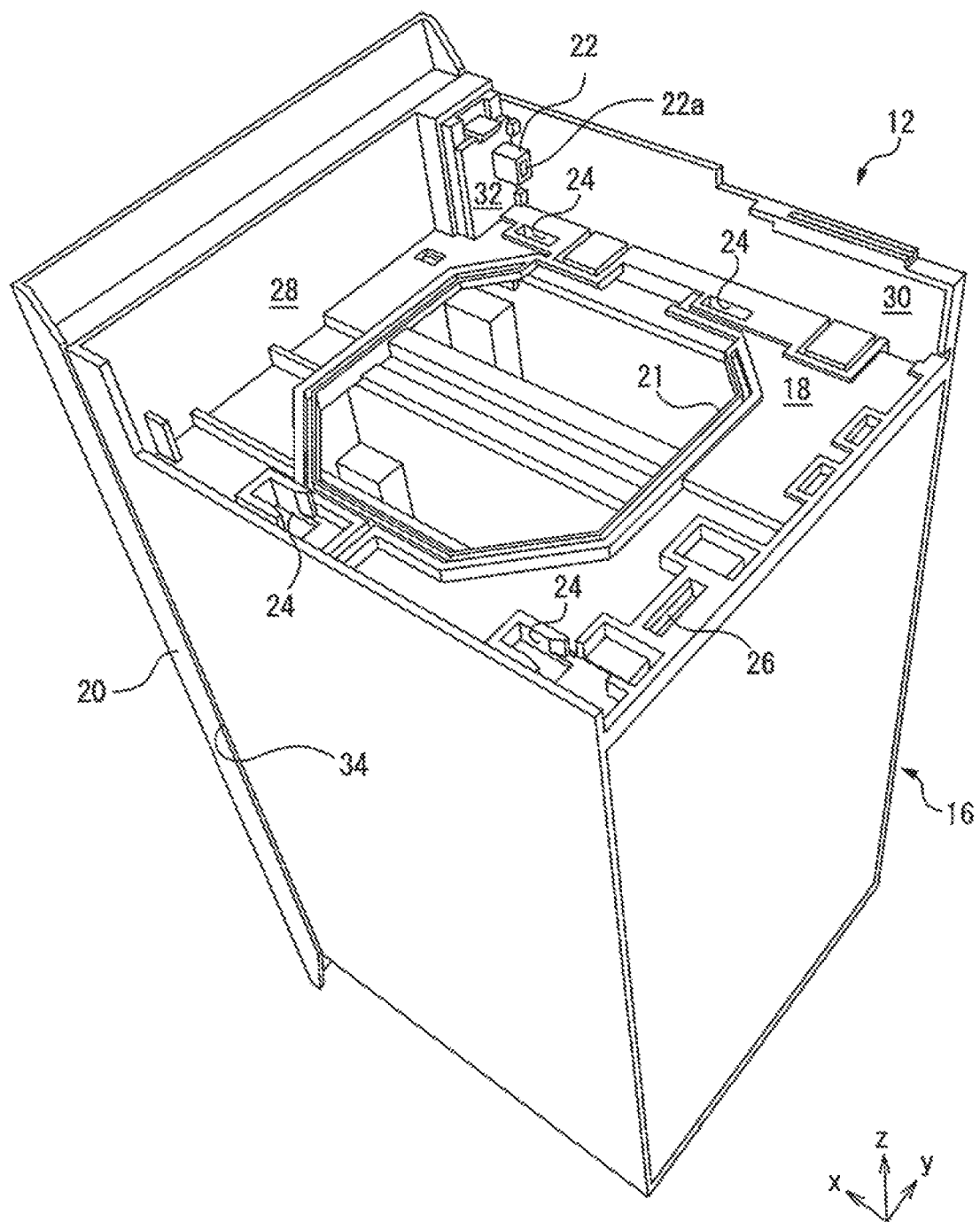
FIG. 2 is a perspective view of a main body in a state where a fan unit is removed from the electrical equipment illustrated in FIG. 1.

As illustrated in FIG. 2, a ventilation hole 21, a plurality of guide holes 24, and a retaining hole 26 are formed in an end wall 18 in the z-axis positive direction of the housing 16. The ventilation hole 21 is disposed at substantially the center of the end wall 18, and penetrates the end wall 18 in the z-axis direction. Each guide hole 24 is an elongate hole (or slot) elongated in the x-axis direction, and penetrates the end wall 18 in the z-axis direction. In the present embodiment, a total of four guide holes 24 are arranged around the ventilation hole 21. The retaining hole 26 is an elongate hole (or slot) elongated in the y-axis direction, and penetrates the end wall 18 in the z-axis direction.

The end wall 18 is formed with extension walls 28 and 30 extending from the end wall 18 in the z-axis positive direction. The extension wall 28 extends from an end edge in the x-axis positive direction of the end wall 18, while the extension wall 30 extends from an end edge in the y-axis positive direction of the end wall 18. The extension walls 28 and 30 are substantially orthogonal. A substrate 32 is fixed to the extension wall 28, and the connector 22 is mounted on the substrate 32. The bracket 20 is fixed to an end wall 34 in the x-axis positive direction of the housing 16.

The fan unit 14 is detachably attached to the main body 12. Below, the fan unit 14 will be described with reference to FIGS. 3 to 6. The fan unit 14 includes a fan 36, a casing 38, and a substrate 40. The fan 36 includes a rotor 42 having a plurality of vanes 42a (FIGS. 4 and 5), a fan housing 44 (FIGS. 5 and 6) rotatably housing the rotor 42, an attachment member 46 provided at an end in the x-axis negative direction of the fan housing 44, and a fan motor 48 fixed to the fan housing 44 and configured to rotate the rotor 42.

Figure 5:
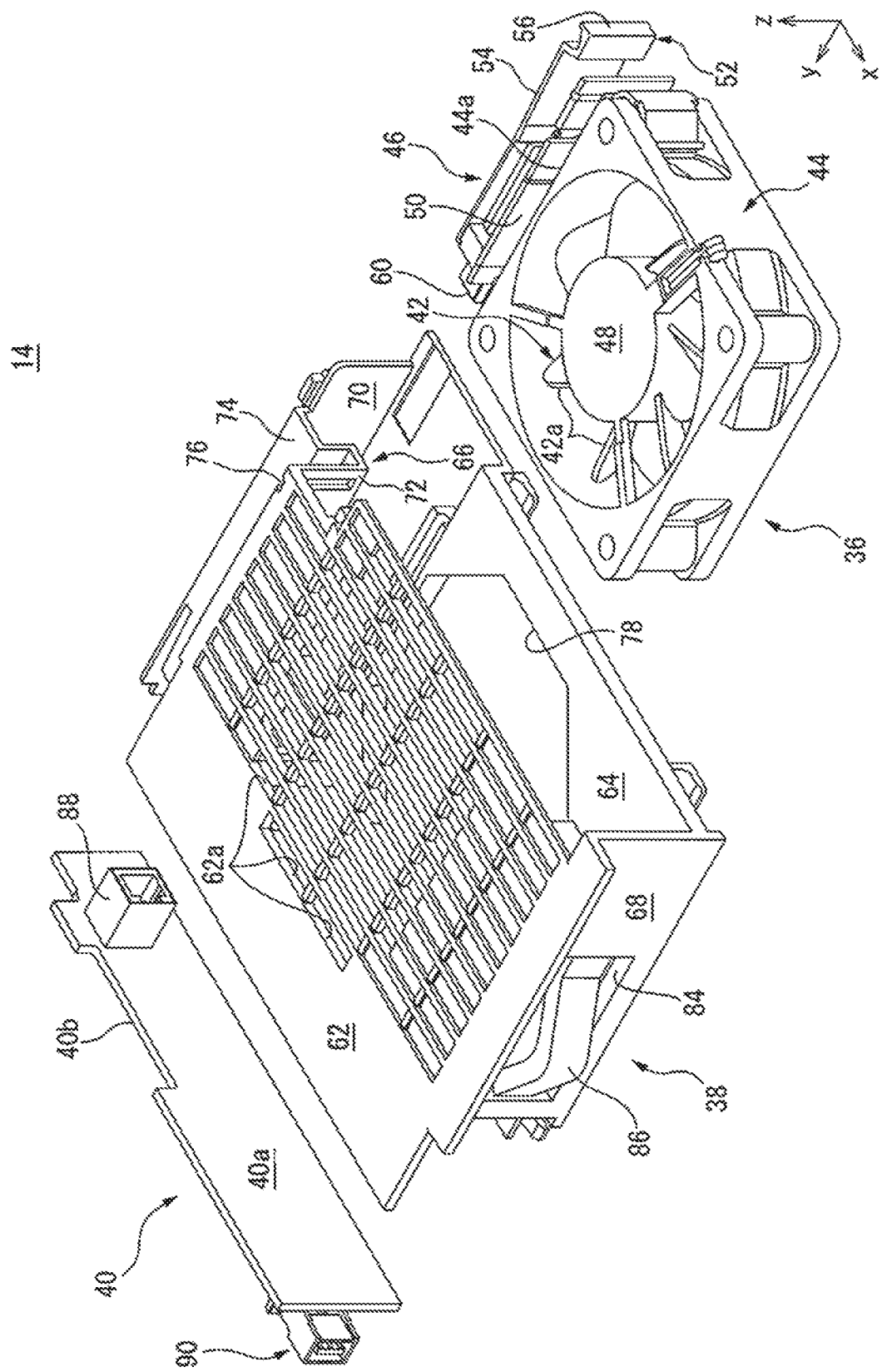
FIG. 5 is an exploded perspective view of the fan unit illustrated in FIG. 1.
Figure 6:
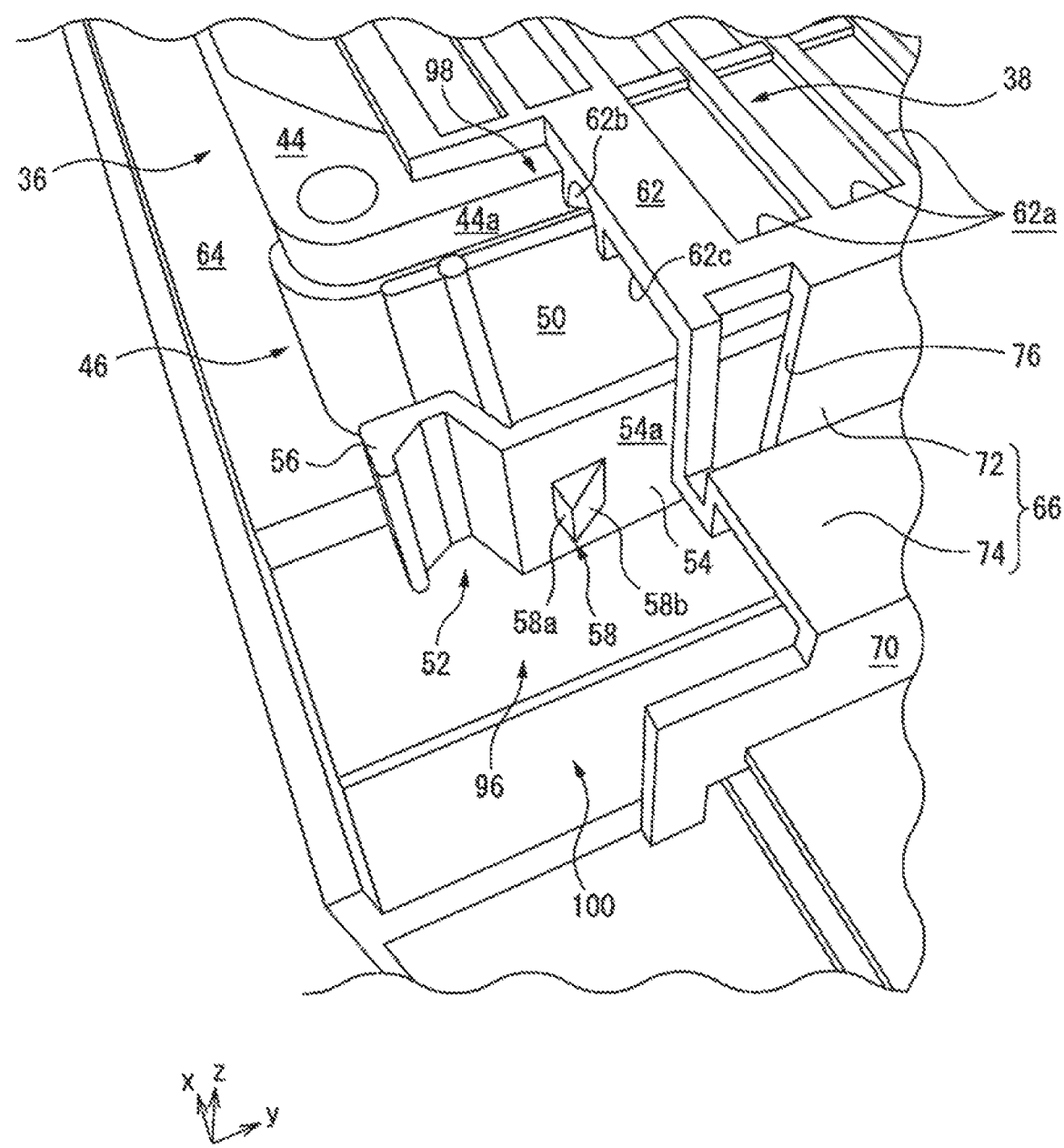
FIG. 6 is a view for explaining an attachment structure for a fan mounted/demounted to/from a casing of a fan unit.

As illustrated in FIGS. 5 and 6, the attachment member 46 includes a base part 50 fixed to an end face 44a in the x-axis negative direction of the fan housing 44, and a movable part 52 movably coupled to the base part 50. The base part 50 is an elongate plate member elongated in the y-axis direction. The movable part 52 includes a plate-shaped main body portion 54 extending so as to be opposite to the base part 50, a handling portion 56 provided at an end in the y-axis negative direction of the plate-shaped main body portion 54, and a retaining pawl 58 (FIG. 6) provided at the plate-shaped main body portion 54. The plate-shaped main body portion 54, and a retaining pawl 58 (FIG. 6) provided at the plate-shaped main body portion 54. The plate-shaped main body portion 54 is coupled, at its end in the y-axis positive direction, to an end in the y-axis positive direction of the base part 50. The handling portion 56 extends in a substantial U-shape, as viewed from the z-axis.

As illustrated in FIG. 6, the retaining pawl 58 is formed integrally with a surface 54a of the plate-shaped main body portion 54 on a side opposite the base part 50, so as to protrude from the surface 54a in the x-axis negative direction. The retaining pawl 58 includes an end face 58a in the y-axis negative direction and an inclined surface 58b. The end face 58a is substantially orthogonal to the surface 54a (or the y-axis) of the plate-shaped main body portion 54. On the other hand, the inclined surface 58b is inclined with respect to the y-axis, and integrally connected to the surface 54a and the end face 58a. As illustrated in FIG. 5, a connector 60 is provided at an end in the y-axis positive direction of the attachment member 46. The connector 60 is electrically connected to the fan motor 48.

With reference to FIGS. 3 to 6, the casing 38 houses the fan 36. Specifically, the casing 38 includes an end wall 62 in the z-axis positive direction, an end wall 64 in the z-axis negative direction opposite to the end wall 62, a support wall 66 formed at an end part in the x-axis negative direction of the end wall 62, an end wall 68 in the x-axis positive direction extending between the end walls 62 and 64, and an end wall 70 in the x-axis negative direction extending between the support wall 66 and the end wall 64.

The end wall 62 is formed with a plurality of ventilation holes 62a and a guide groove 62b (FIG. 6). Each ventilation hole 62a has a substantially rectangular shape and penetrates the end wall 62 in the z-axis direction. As illustrated in FIG. 6, the guide groove 62b is provided at an inner surface 62c of the end wall 62 so as to open toward the inside of the casing 38, and linearly extends in the y-axis direction.

Figure 4:
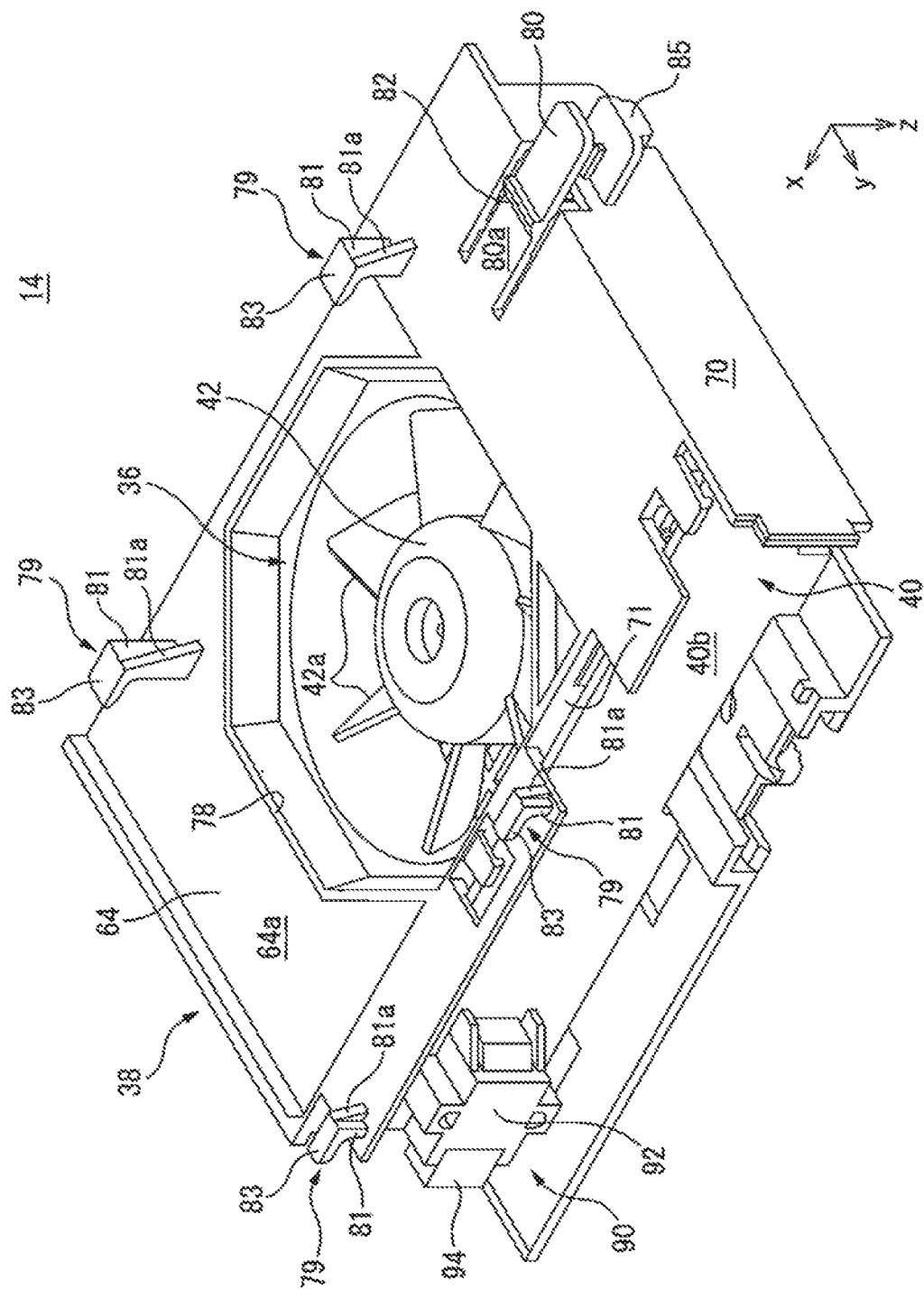
FIG. 4 is a perspective view of the fan unit illustrated in FIG. 1.

As illustrated in FIG. 4, an opening 78, a plurality of guide hooks 79 and a handling portion 80 are provided at the end wall 64. The opening 78 is disposed at substantially the center of the end wall 64. In the present embodiment, a total of four guide hooks 79 are formed integrally with the end wall 64. The guide hooks 79 are arranged at positions corresponding to the guide holes 24 (FIG. 2) formed in the end wall 18 of the housing 16, respectively.

Figure 7:
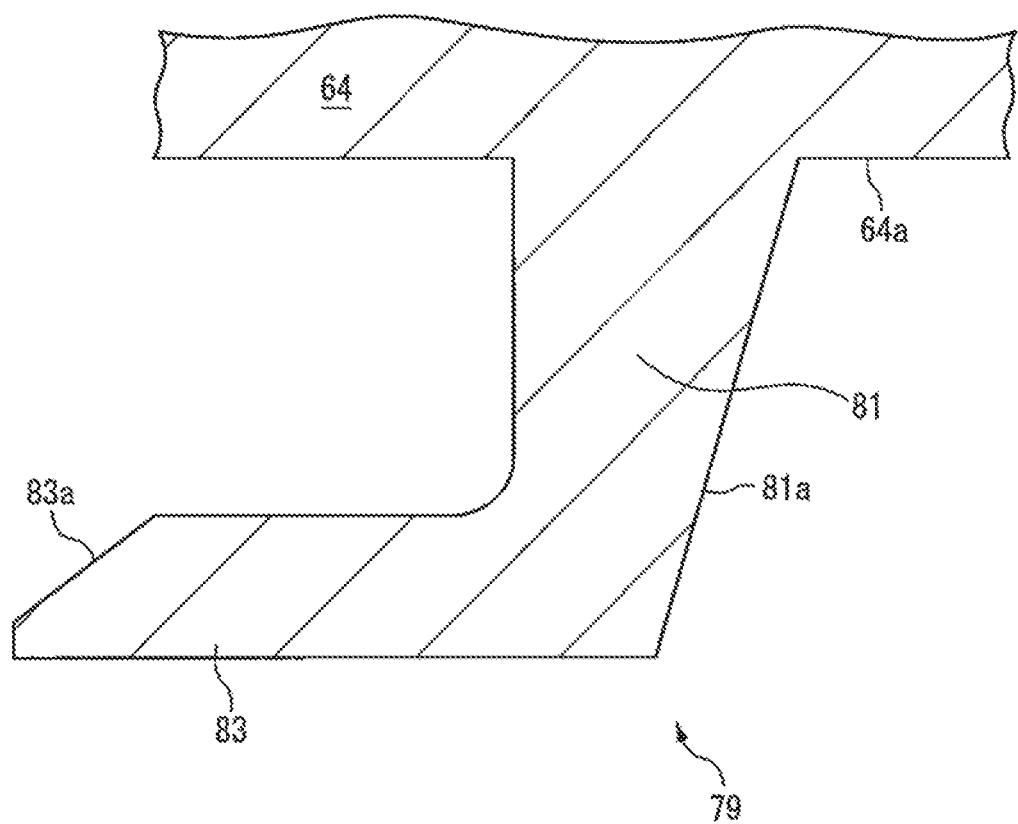
FIG. 7 is an enlarged view of a guide hook provided in the casing.

As illustrated in FIG. 7, each guide hook 79 includes a first portion 81 extending in the z-axis negative direction from a surface 64a of the end wall 64, and a second portion 83 extending in the x-axis positive direction from an end in the z-axis negative direction of the first portion 81. The first portion 81 includes an inclined surface 81a at its end in the x-axis negative direction. The inclined surface 81a is inclined with respect to the x-axis so as to extend towards the x-axis negative direction side as it extends in the z-axis positive direction. On the other hand, the second portion 83 includes an inclined surface 83a at its end in the x-axis positive direction. The inclined surface 83a is inclined with respect to the x-axis so as to extend toward the x-axis negative direction side as it extends in the z-axis positive direction.

The handling portion 80 is a substantially rectangular flat-plate member elongated in the x-axis direction, wherein an end in the x-axis positive direction of the handling portion 80 is integrally connected to the end wall 64, while an end in the x-axis negative direction of the handling portion 80 is a free end. When force is applied to the handling portion 80 in a direction substantially parallel to the z-axis, the handling portion 80 is elastically deformed about its end in the x-axis positive direction as a fixed end, whereby the handling portion 80 can be displaced in the direction substantially parallel to the z-axis with respect to the end wall 64.

Figure 8:
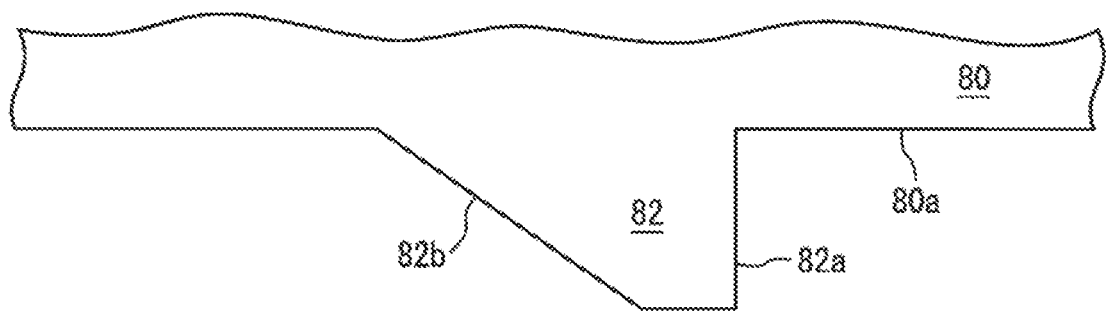
FIG. 8 is an enlarged view of a retaining pawl provided in the casing.
Figure 8:
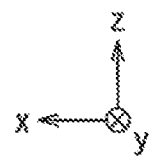

A retaining pawl 82 is formed on an end face 80a in the z-axis negative direction of the handling portion 80. As illustrated in FIG. 8, the retaining pawl 82 is formed integrally with the end face 80a so as to protrude therefrom in the z-axis negative direction. The retaining pawl 82 includes an end face 82a in the x-axis negative direction and an inclined surface 82b provided at an end in the x-axis positive direction of the retaining pawl 82.

The end face 82a is a plane substantially orthogonal to the end face 80a of the handling portion 80 (or substantially parallel to the y-z plane), while the inclined surface 82b is inclined with respect to the end face 80a (or the x-axis) so as to approach the end face 80a from its end edge in the x-axis negative direction toward the positive x-axis and to be connected with the end face 80a at its end edge in the x-axis positive direction. As illustrated in FIG. 4, a handling portion 85 is formed integrally with the end wall 70. The handling portion 85 extends from the end wall 70 in the x-axis negative direction so as to oppose to the handling portion 80.

Figure 3:
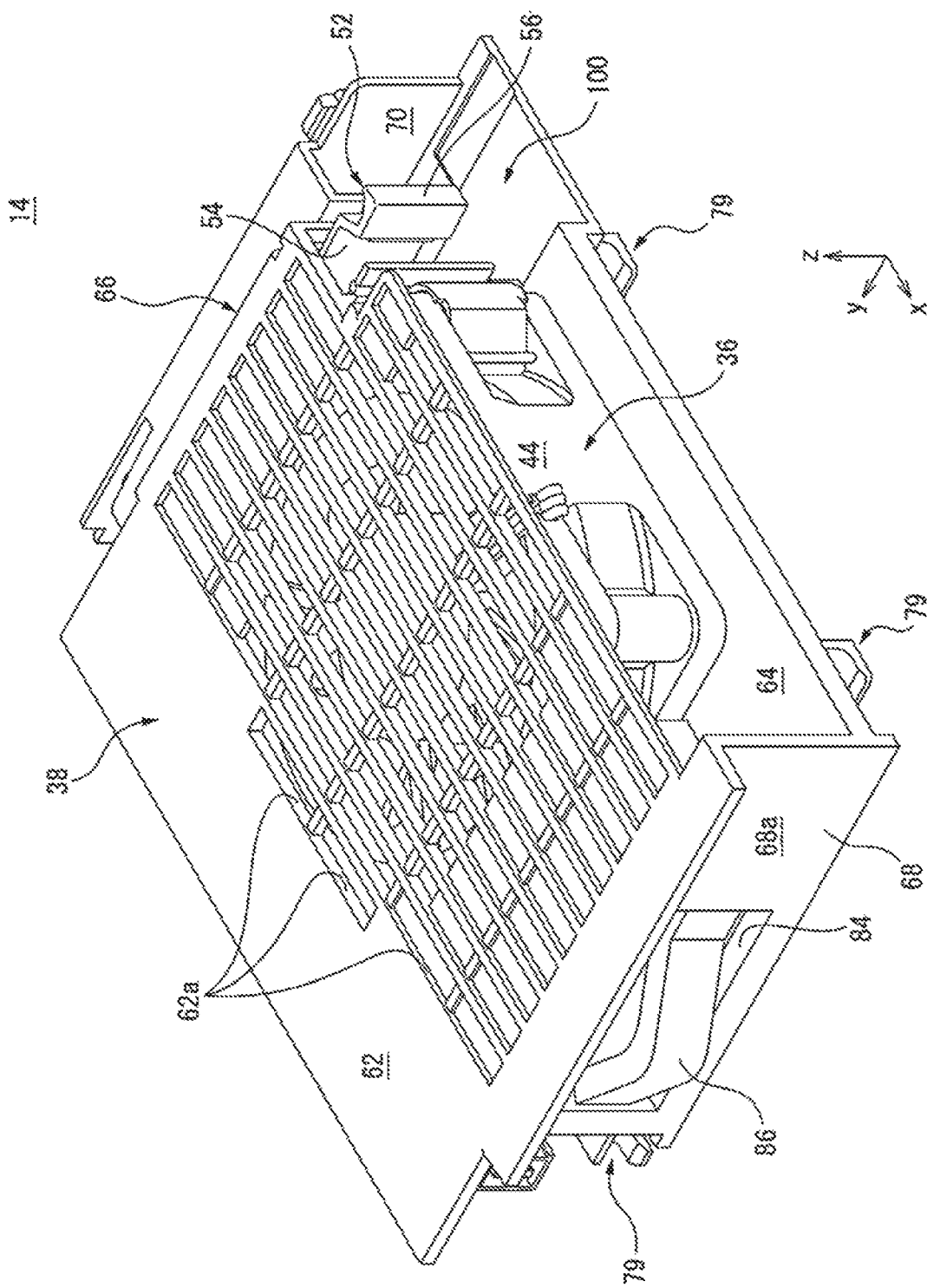
FIG. 3 is a perspective view of the fan unit illustrated in FIG. 1.

With reference to FIGS. 3 and 5, an opening 84 and a biasing portion 86 are formed at the end wall 68. The biasing portion 86 is disposed in the opening 84, wherein its end in the y-axis negative direction is integrally connected to the end wall 68, while its end in the y-axis positive direction is a free end. The biasing portion 86 extends in a curved manner such that a center portion thereof bulges in the x-axis positive direction further than an end face 68a in the x-axis positive direction of the end wall 68. When force is applied to the center portion of the biasing portion 86 in the x-axis negative direction, the biasing portion 86 is elastically deformed about its end in the y-axis negative direction as a fixed end, whereby the biasing portion 86 can be displaced in the x-axis negative direction with respect to the end wall 68.

As illustrated in FIG. 6, the support wall 66 includes a first wall 72 extending in the z-axis negative direction from an end in the x-axis negative direction of the end wall 62, and a second wall 74 extending between the first wall 72 and the end wall 70. The first wall 72 is a flat-plate member disposed substantially parallel to the y-z plane, wherein a retaining hole 76 is formed at an end portion in the y-axis negative direction of the first wall portion 72. In the present embodiment, the retaining hole 76 is an elongate hole (or slot) elongated in the z-axis direction, and penetrates the first wall 72.

As illustrated in FIGS. 4 and 5, the substrate 40 is fixed to an end wall 71 in the y-axis positive direction of the casing 38. A connector 88 is provided on a surface 40a of the substrate 40 that faces the casing 38, while a connector 90 is provided on a surface 40b of the substrate 40 opposite the surface 40a. The connectors 88 and 90 are electrically connected to each other via an electrical circuit mounted on the substrate 40.

Figure 9:
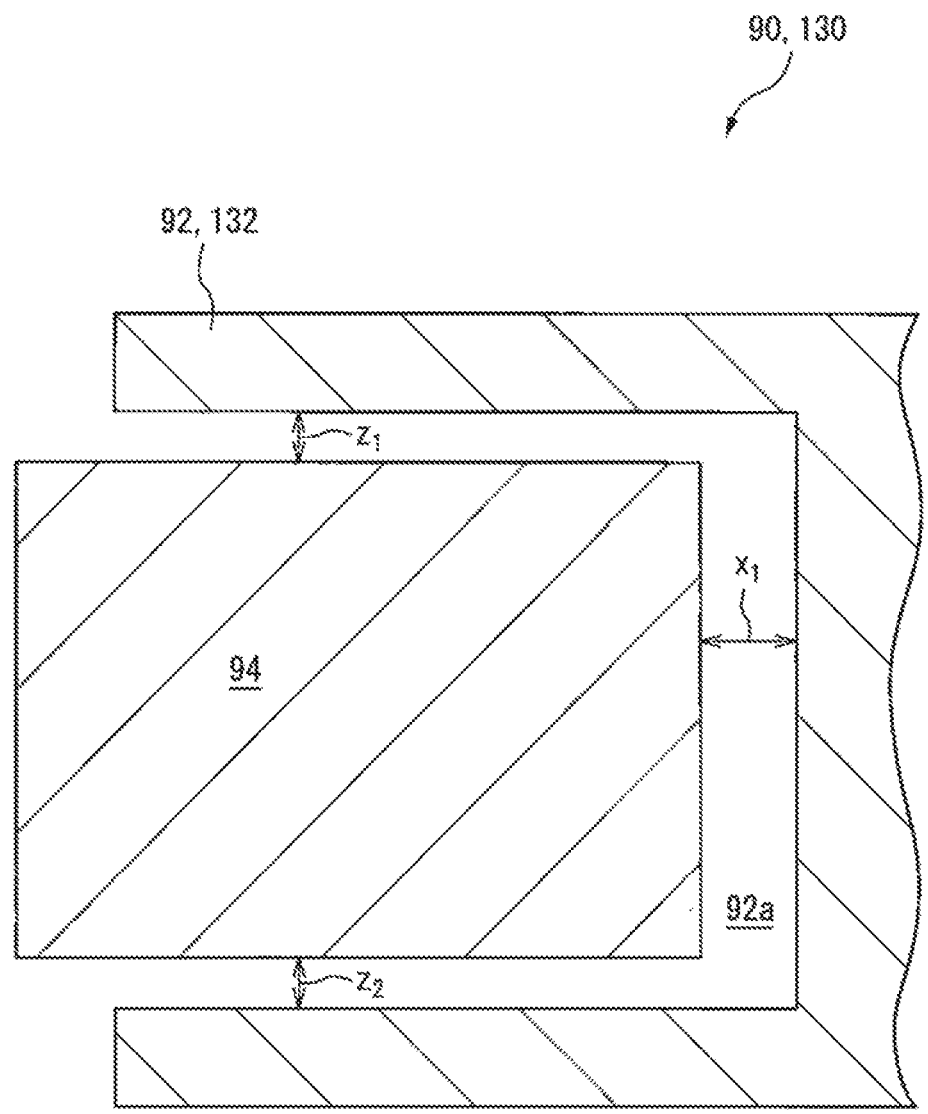
FIG. 9 is a cross-sectional view of a connector illustrated in FIG. 4 taken along an x-z plane.
Figure 10:
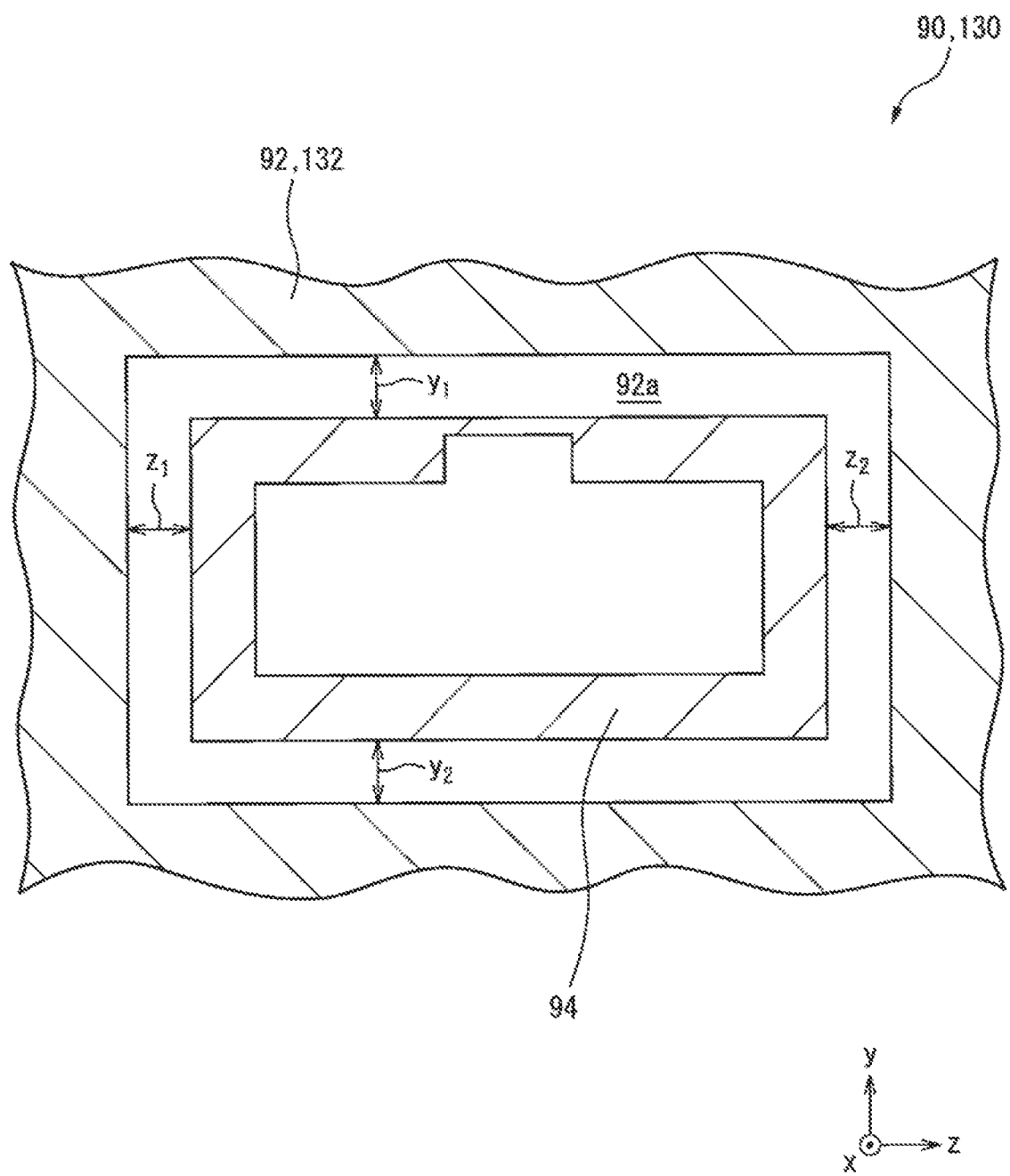
FIG. 10 is a cross-sectional view of the connector illustrated in FIG. 9 taken along a y-z plane.

As illustrated in FIGS. 4, 9, and 10, the connector 90 includes a fixed portion 92 and a movable terminal portion 94. The fixed portion 92 is fixed on the surface 40b of the substrate 40. For example, the fixed portion 92 includes a terminal (not illustrated), and is fixed to the surface 40b by soldering the terminal to the electrical circuit of the substrate 40. A receiving hole 92a is formed inside the fixed portion 92.

The movable terminal portion 94 is supported by the fixed portion 92 so as to be displaceable in the x-axis, y-axis, and z-axis directions. Specifically, the movable terminal portion 94 is movably received in the receiving hole 92a of the fixed portion 92, wherein a gap xi in the x-axis direction, gaps $y_1$ and $y_2$ in the y-axis direction, and gaps $z_1$ and $z_2$ in the z-axis direction are respectively formed between the fixed portion 92 and the movable terminal portion 94.

As an example, a flexible material (e.g., a rubber material, a paper material, or a fiber material) may be disposed in at least one of the gaps xi, $y_1$, $y_2$, $z_1$, and $z_2$, whereby the movable terminal portion 94 can be movably supported by the fixing portion 92 via the flexible material. Alternatively, the gaps xi, $y_1$, $y_2$, $z_1$, and $z_2$ may each be a hollow cavity. The movable terminal portion 94 is inserted to and removed from the connector 22 (FIG. 2) of the main body 12 in the x-axis direction.

Thus, in the present embodiment, the movable terminal portion 94 is supported by the fixed portion 92 so as to be displaceable in the connection direction of the movable terminal portion 94 (i.e., the x-axis direction) and a direction intersecting the connection direction (i.e., the y-axis direction, the z-axis direction). Although not illustrated in the drawings, the movable terminal portion 94 includes a terminal therein, which is electrically connected to the electrical circuit mounted on the substrate 40.

Next, a method of attachment of the fan 36 to the casing 38 will be described with reference to FIGS. 5 and 6. When attaching the fan 36 to the casing 38, an operator moves the fan 36 in the y-axis positive direction from the position illustrated in FIG. 5, so as to insert into the casing 38. At this time, as illustrated in FIG. 6, the operator fits the base part 50 of the attachment member 46 of the fan 36 into the guide groove 62b formed at the end wall 62 of the casing 38.

Then, the operator performs a first slide motion to slide the fan 36 toward the y-axis positive direction in the casing 38. The first slide motion is guided by engagement between the base part 50 of the fan 36 and the guide groove 62b, and engagement between the plate-shaped main body portion 54 of the fan 36 and the first wall 72 of the casing 38. Accordingly, the guide groove 62b and the first wall 72 constitute a guide mechanism 98 (FIG. 6) configured to guide the first slide motion.

Figure 11:
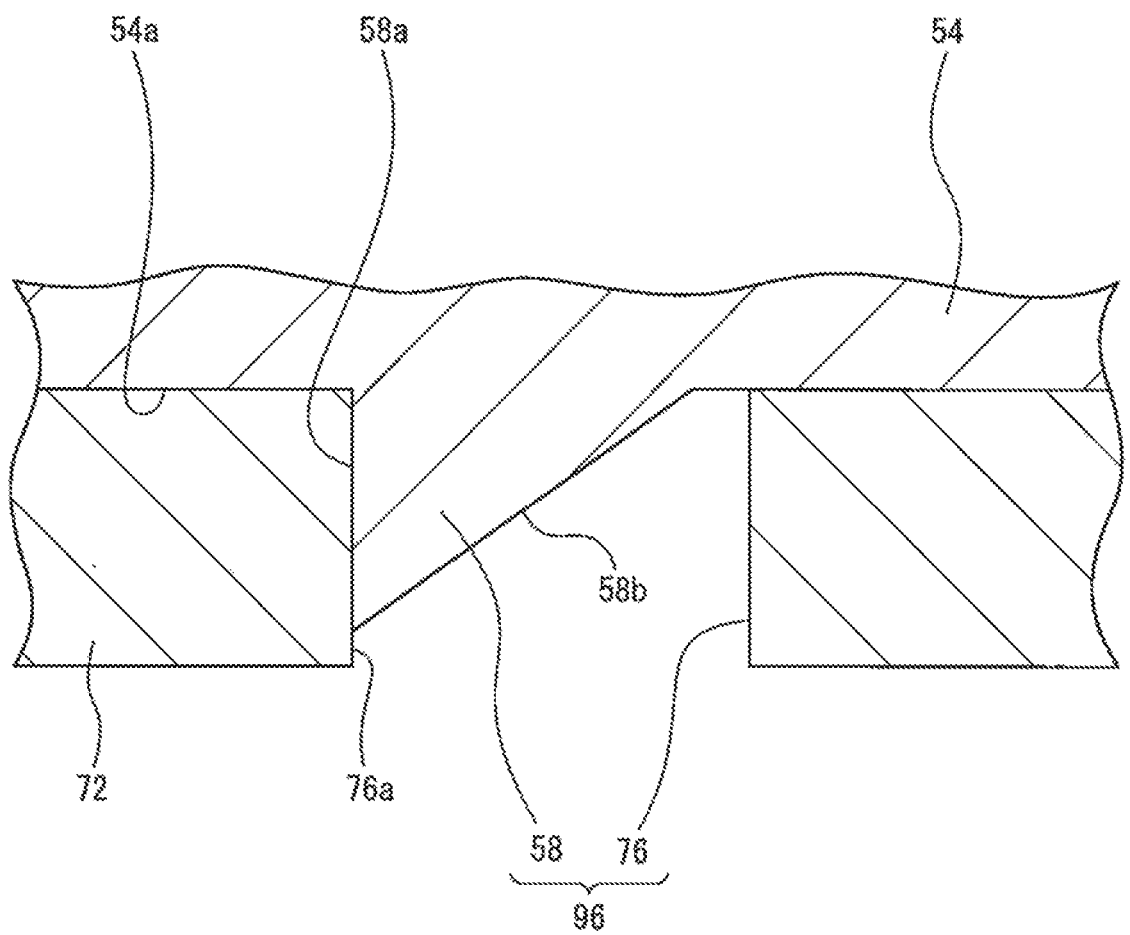
FIG. 11 illustrates a state where the retaining pawl of the fan is engaged with a retaining hole of the casing when the fan is disposed at a fan-mounting position relative to the casing.

During the first slide motion, the inclined surface 58b of the retaining pawl 58 engages with the end in the negative y-direction of the first wall portion 72, and the movable part 52 is elastically deformed to be displaced toward the base part 50 due to the action of the inclined surface 58b as the fan 36 is moved in the y-axis positive direction. When the fan 36 is disposed at a predetermined fan-mounting position, the retaining pawl 58 of the fan 36 is received in the retaining hole 76 of the casing 38 as illustrated in FIG. 11, and the end face 58a of the retaining pawl 58 engages with a surface 76a that defines the retaining hole 76. As a result, the movement of the fan 36 in the y-axis negative direction is restricted.

As described above, in the present embodiment, by the engagement between the retaining pawl 58 and the retaining hole 76, the movement of the fan 36 relative to the casing 38 in the y-axis negative direction is restricted when the fan 36 is disposed at the fan-mounting position. Accordingly, the retaining pawl 58 and the retaining hole 76 constitute a retaining mechanism 96 (FIG. 11). When the fan 36 is disposed at the fan-mounting position, the connector 60 (FIG. 5) of the fan 36 is connected to the connector 88 of the substrate 40 fixed to the casing 38. In this way, the fan unit 14 illustrated in FIGS. 3 and 4 is assembled.

On the other hand, when detaching the fan 36 from the casing 38, the operator grips the handling portion 56 of the fan 36 and displaces the handling portion 56 and the movable part 52 in the direction toward the base part 50 (i.e., in the x-axis positive direction). Due to this, the retaining pawl 58 is disengaged from the retaining hole 76. In this state, the operator moves the fan 36 in the y-axis negative direction while gripping the handling portion 56. As a result, the fan 36 is pulled out of the casing 38.

As described above, in the present embodiment, the first slide motion of the fan 36 in the attachment direction (i.e., in the y-axis direction) within the casing 38 is guided by the guide mechanism 98, and the fan 36 is fixed to the casing 38 by the retaining mechanism 96. Thus, the retaining mechanism 96 and the guide mechanism 98 constitute an attachment structure (second attachment structure) 100 (FIGS. 3 and 6) configured to detachably attach the fan 36 to the casing 38.

Figure 12:
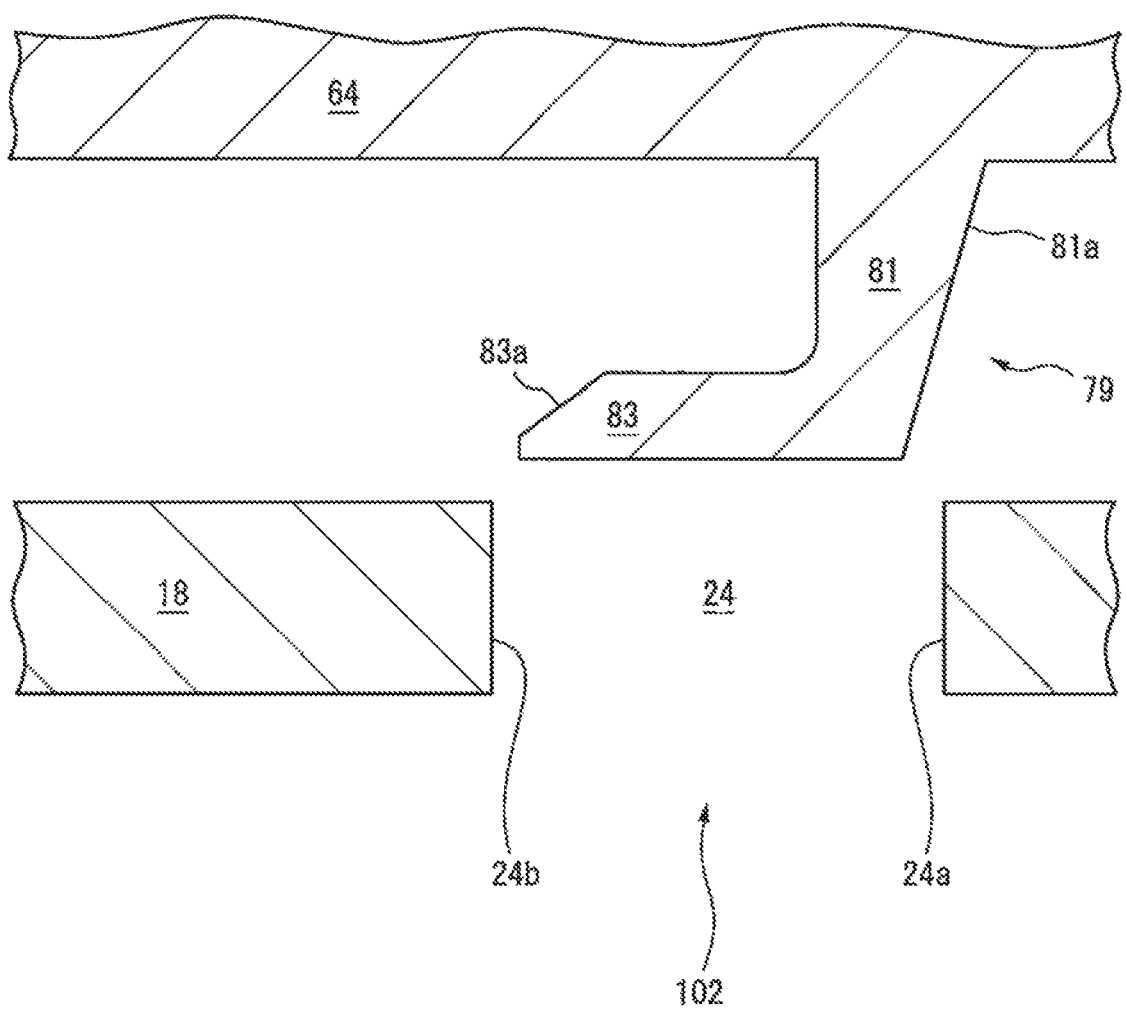
FIG. 12 illustrates a state where the guide hook is not inserted into a guide hole.

Next, a method of attachment of the fan unit 14 to the main body 12 will be described with reference to FIGS. 2 to 4 and FIGS. 12 to 16. When attaching the fan unit 14 to the main body 12, the operator disposes the fan unit 14 at the z-axis positive direction side of the main body 12 such that the guide hooks 79 formed at the casing 38 of the fan unit 14 are respectively disposed at positions separate in the z-axis positive direction from the guide holes 24 formed in the end wall 18 of the main body 12. The guide hook 79 and the guide hole 24 at this time are illustrated in FIG. 12.

Figure 13:
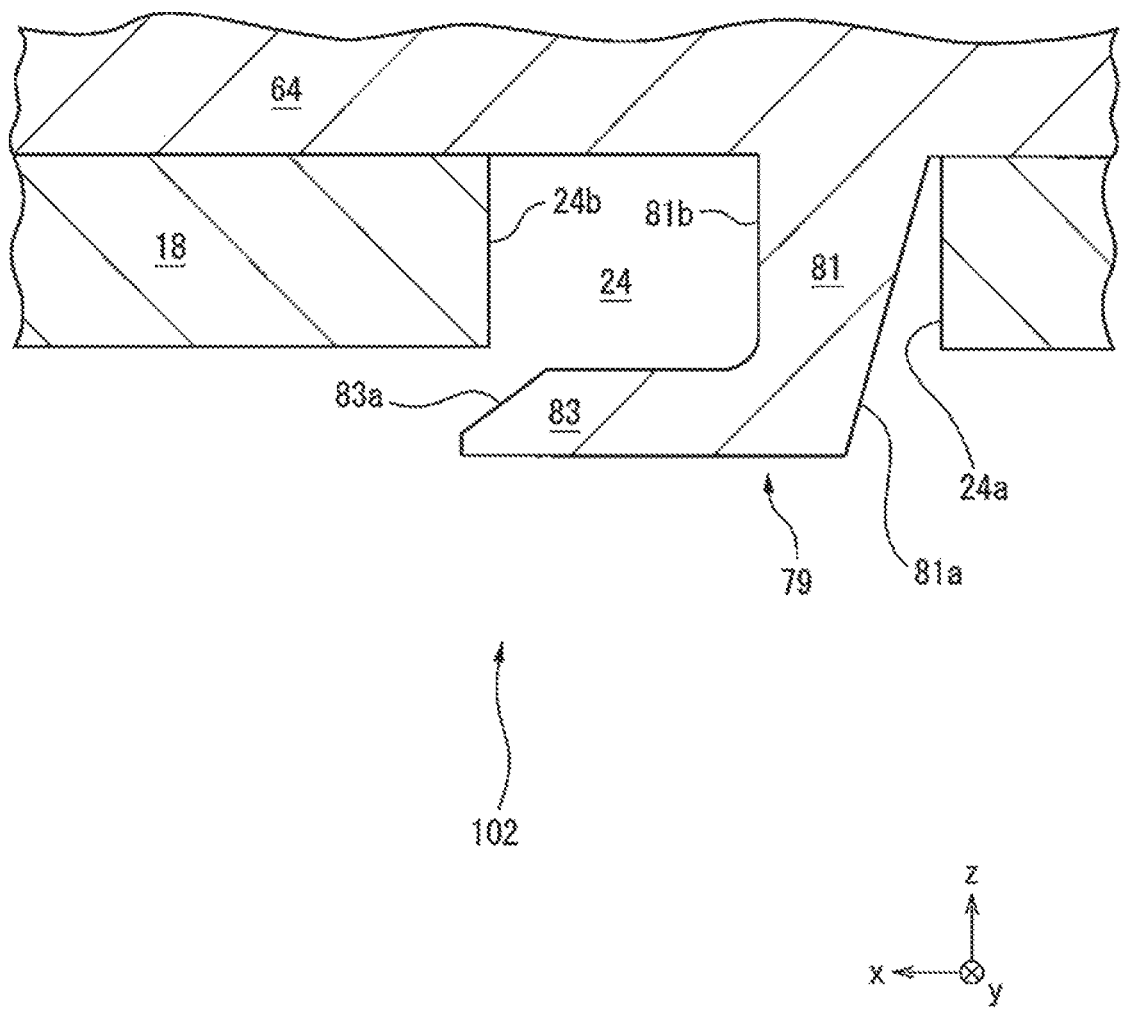
FIG. 13 illustrates a state where the guide hook is inserted into the guide hole.

Then, the operator performs an insertion motion to move the fan unit 14 in the z-axis negative direction so as to insert the guide hook 79 into the guide hole 24 as illustrated in FIG. 13. During this insertion motion, the inclined surface 81a of the guide hook 79 contact an end face 24a in the x-axis negative direction that defines the guide hole 24, by which the fan unit 14 is guided to slightly move in the x-axis positive direction.

Figure 14:
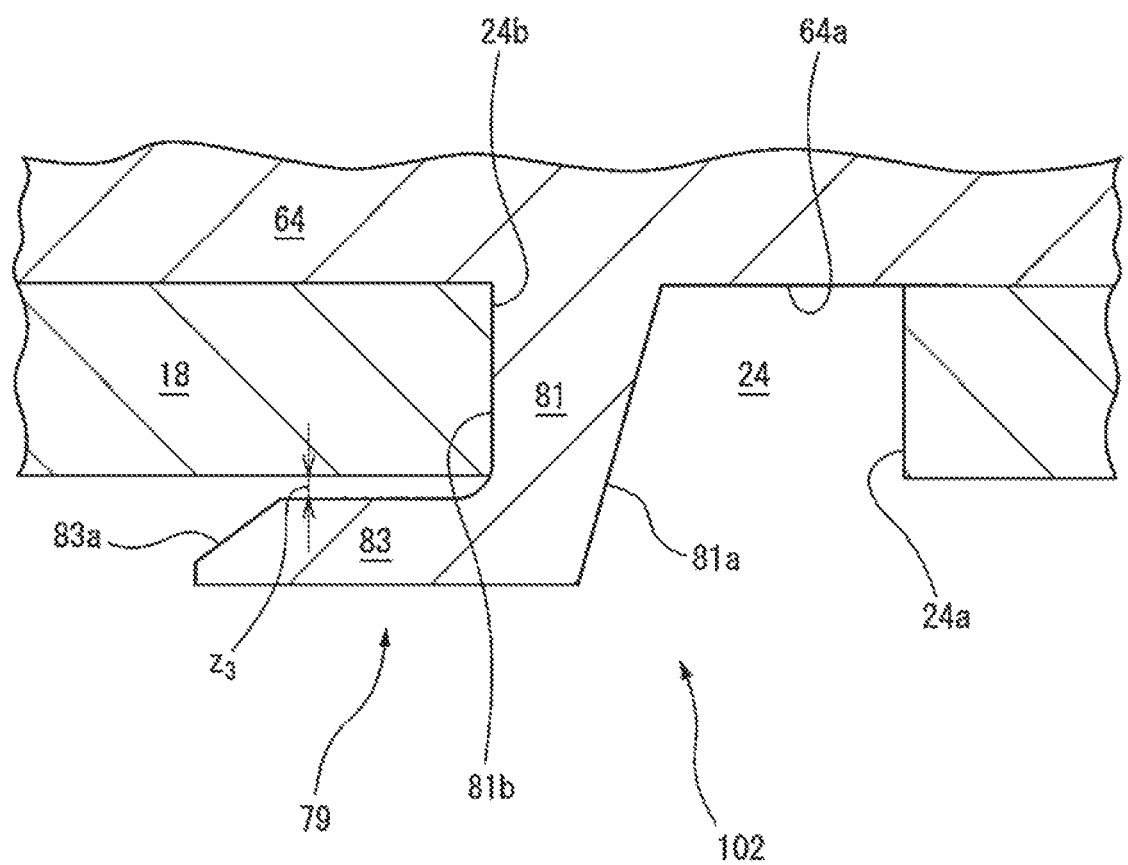
FIG. 14 illustrates the guide hook and the guide hole when the casing is disposed at a mounting position relative to the main body.
Figure 15:
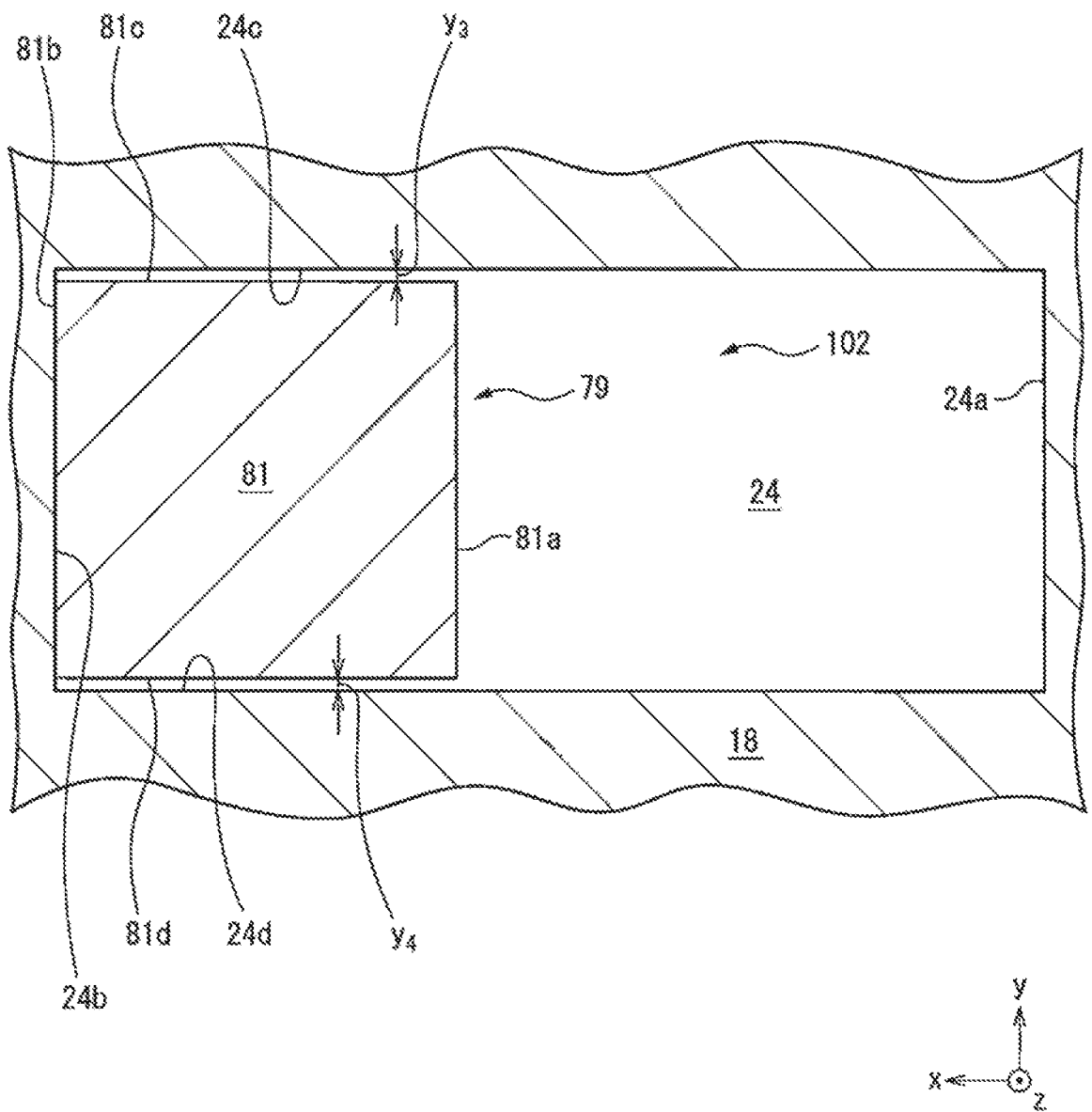
FIG. 15 illustrates the guide hook and the guide hole when the casing is at the mounting position relative to the main body.

The operator then performs a second slide motion to slide the casing 38 of the fan unit 14 in the x-axis positive direction relative to the main body 12, so as to move the casing 38 (i.e., the fan unit 14) to the mounting position. When the fan unit 14 is disposed at the mounting position by the second slide motion, an end face 81b in the x-axis positive direction of the first portion 81 of the guide hook 79 contact an end face 24b in the x-axis positive direction that defines the guide hole 24, as illustrated in FIGS. 14 and 15. By the engagement between the second portion 83 of the guide hook 79 and the end wall 18 of the main body 12, the disengagement motion of the guide hook 79 from the guide hole 24 is restricted.

In addition, the biasing portion 86 (FIG. 3) provided at the end wall 68 of the casing 38 is elastically deformed by abutting against the extension wall 28 (FIG. 2) of the housing 16, and displaced in the x-axis negative direction from the initial position illustrated in FIG. 3. As a result, the biasing portion 86 biases the casing 38 toward the x-axis negative direction as reaction force due to the elastic deformation.

In addition, the movable terminal portion 94 of the connector 90 of the fan unit 14 is connected in the x-axis positive direction to the connector 22 provided at the main body 12. Thus, the electronic components housed in the housing 16 of the main body 12 is electrically connected to the fan motor 48 of the fan 36 via the connector 22, the connector 90, the electrical circuit mounted on the substrate 40, the connector 88, and the connector 60.

When power is supplied to the fan motor 48 from the electronic components of the main body 12, the fan motor 48 rotates the rotor 42, whereby air flow is generated through the ventilation hole 62a and the opening 78 of the casing 38 and the ventilation hole 21 of the housing 16, and the electronic component inside the housing 16 can be cooled by the airflow.

Note that the area in the y-z plane of an opening 22a (FIG. 2) of the connector 22 that receives the movable terminal portion 94 is larger than the movable terminal portion 94, and a taper is formed at the opening 22a such that the area thereof increases further toward the x-axis negative direction. Due to this, it is possible to reliably insert the movable terminal portion 94, which is movable along the y-z plane, into the opening 22a, during the second slide motion.

The second slide motion of the casing 38 relative to the main body 12 is guided by the engagement between an end face 81c (FIG. 15) in the y-axis positive direction of the first portion 81 of the guide hook 79 and an end face 24c in the y-axis positive direction that defines the guide hole 24, and the engagement between an end face 81d in the y-axis negative direction of the first portion 81 and an end face 24d in the y-axis negative direction that defines the guide hole 24.

Accordingly, the guide hook 79 and the guide hole 24 constitute a guide mechanism 102 configured to guide the second slide motion. In addition, during the second slide motion, by the inclined surface 83a formed at the second portion 83 of the guide hook 79, the second portion 83 is easily inserted to the z-axis negative direction side of the end wall 18 of the main body 12.

Figure 16:
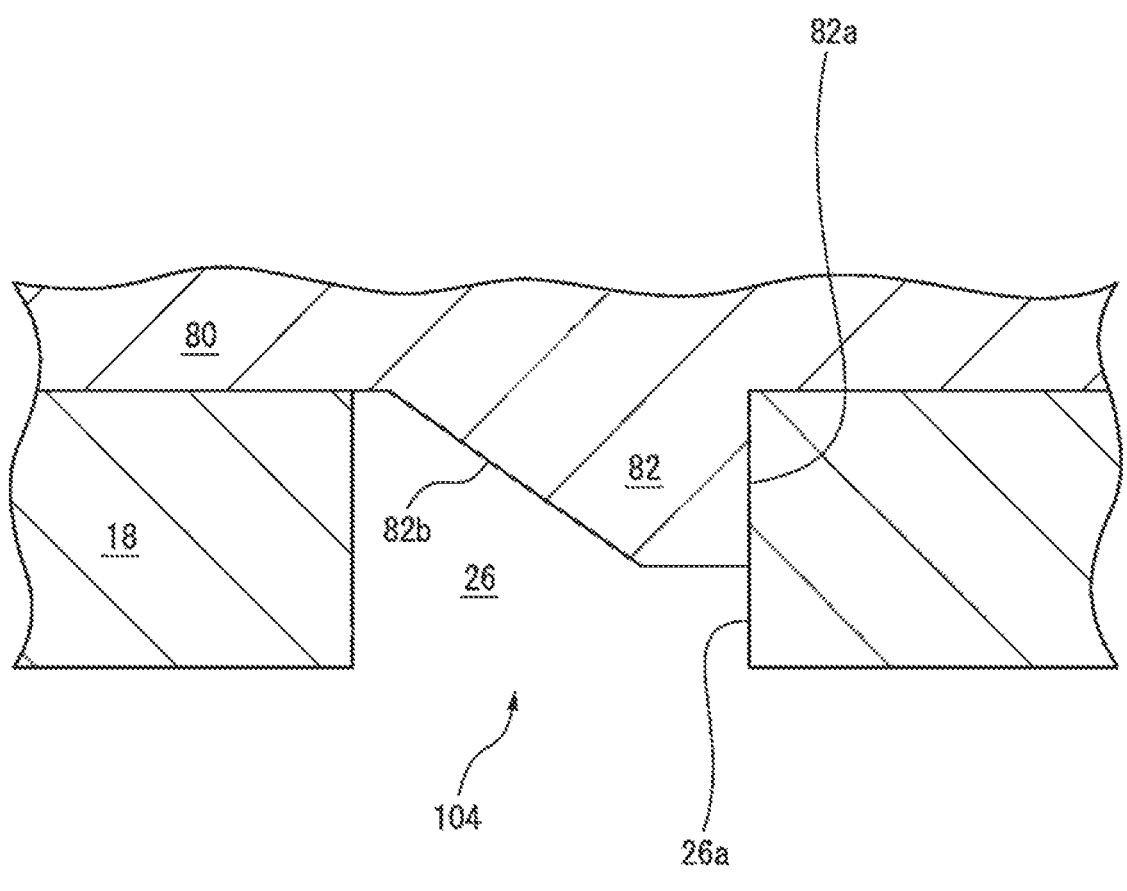
FIG. 16 illustrates a state where the retaining pawl of the casing is engaged with the retaining hole of the main body when the casing is disposed at the mounting position relative to the main body.

When the fan unit 14 is disposed at the mounting position, the retaining pawl 82 provided at the handling portion 80 of the casing 38 is received in the retaining hole 26 provided at the end wall 18 of the main body 12, as illustrated in FIG. 16. At this time, the end face 82a of the retaining pawl 82 engages with an end face 26a in the x-axis negative direction that defines the retaining hole 26, whereby the movement of the casing 38 in the x-axis negative direction is restricted.

Accordingly, the retaining pawl 82 and the retaining hole 26 constitute a retaining mechanism 104 configured to restrict the movement of the casing 38 in the x-axis negative direction. On the other hand, by the inclined surface 82b formed at the retaining pawl 82, the retaining pawl 82 is allowed to move in the x-axis positive direction relative to the end wall 18 of the main body 12, during the second slide motion.

When the fan unit 14 is disposed at the mounting position, the end wall 18 of the main body 12 is clamped between the second portion 83 of the guide hook 79 and the end wall 64 of the casing 38 as illustrated in FIG. 14, whereby restricting the movement of the casing 38 in the z-axis direction. In addition, the movement of the casing 38 in the y-axis direction is restricted by the engagement between the first portion 81 of the guide hook 79 and the end faces 24c and 24d of the guide hole 24.

In addition, the movement of the casing 38 in the x-axis direction is restricted by the engagement between the retaining pawl 82 and the retaining hole 26, and the engagement between the end face 81b of the first portion 81 of the guide hook 79 and the end face 24b of the guide hole 24. In this way, the fan unit 14 is attached to the main body 12 at the predetermined mounting position as illustrated in FIG. 1, in which the movement of the fan unit 14 in the x-axis, y-axis and z-axis directions is restricted.

In the present embodiment, as illustrated in FIG. 14, a gap $z_3$ is formed between the second portion 83 of the guide hook 79 and the end wall 18 of the main body 12 when the fan unit 14 is disposed at the mounting position. In addition, as illustrated in FIG. 15, a gap $y_3$ is formed between the first portion 81 of the guide hook 79 and the end face 24c of the guide hole 24, and a gap $y_4$ is formed between the first portion 81 of the guide hook 79 and the end face 24d of the guide hole 24.

On the other hand, when detaching the fan unit 14 from the main body 12, the operator grips the handling portions 80 and 85, and displaces the free end of the handling portion 80 toward the handling portion 85 (i.e., in the z-axis positive direction). Due to this, the retaining pawl 82 is disengaged from the retaining hole 26, whereby allowing the casing 38 to move in the x-axis negative direction. At this time, the casing 38 is automatically pushed in the x-axis negative direction by the action of the biasing portion 86 described above.

Then, the operator performs a third slide motion to slide the casing 38 in the x-axis negative direction relative to the main body, while gripping the handling portions 80 and 85. The third slide motion is guided by the guide mechanism 102. During the third slide motion, the inclined surface 81a of the guide hook 79 engages with the end face 24a of the guide hole 24, whereby the casing 38 is guided to move in the z-axis positive direction. As a result, the guide hook 79 is disengaged from the guide hole 24, whereby the fan unit 14 can be pulled out from the main body 12 in the x-axis negative direction.

As described above, in the present embodiment, the fan unit 14 can be detachably attached to the main body 12 in the x-axis direction, by the guide mechanism 102 and the retaining mechanism 104. Accordingly, the guide mechanism 102 and the retaining mechanism 104 constitute an attachment structure 106 (FIG. 1) configured to detachably attach the fan unit 14 to the main body 12.

According to the present embodiment in which the electrical equipment 10 includes such an attachment structure 106, the operator can easily attach and detach the fan unit 14 to and from the main body 12 in the x-axis direction, without using a fastener such as a bolt. This is significantly advantageous in a case where the operator can access the fan unit 14 only from the x-axis negative direction side due to spatial restriction around the electrical equipment 10, for example.

When maintenance (e.g., replacement) of the fan 36 is required in such a case, the operator can pull and remove the fan unit 14 from the main body 12 in the x-axis negative direction as described above, and then remove the fan 36 from the casing 38 by operating the handling portion 56 as described above. Then, the operator can attach a new fan 36 to the casing 38, and subsequently attach the fan unit 14 to the main body 12 in the x-axis positive direction. In this way, even in the case where the operator can access the fan unit 14 only from the x-axis direction, the operator can easily carry out the maintenance of the fan 36.

In addition, in the present embodiment, the guide mechanism 102 includes the guide hook 79 and the guide hole 24. According to this configuration, the guide mechanism 102 can be configured with a relatively simple structure, and the second slide motion can also be reliably repeated by the engagement between the guide hook 79 and the guide hole 24.

Further, in the present embodiment, the retaining mechanism 104 includes the retaining pawl 82 and the retaining hole 26. According to this configuration, it is possible to reliably prevent the casing 38 of the fan unit 14 disposed at the mounting position from shifting in the x-axis negative direction, with a relatively simple structure.

Further, in the present embodiment, the handling portion 80 is elastically deformed in response to the operation by the operator such that the retaining pawl 82 can be displaceable between an engagement position (FIG. 16) at which the retaining pawl 82 engages with the retaining hole 26 and a disengage position at which the retaining pawl 82 disengages from the retaining hole 26. According to this configuration, the operator can easily engage and disengage the retaining pawl 82 with and from the retaining hole 26 by operating the handling portion 80 when attachment and detachment of the fan unit 14.

Further, in the present embodiment, the movable terminal portion 94 of the connector 90 is movably supported by the fixed portion 92. According to this configuration, when vibration occurs in the electrical equipment 10 in a state where the connector 90 is connected to the connector 22 of the main body 12, it is possible to mitigate stress acting on the movable terminal portion 94, whereby preventing wiring of the movable terminal portion 94 from being disconnected.

In this regard, the electrical equipment 10 is the numerical control device or motor drive device of the machine tool, and installed inside a cabinet in a factory. In this case, vibration may occur in the electrical equipment 10 during machining by the machine tool or opening and closing of a door of the cabinet. According to the connector 90 in the present embodiment, even when such vibration occurs, it is possible to prevent wiring of the movable terminal portion 94 from being disconnected, whereby the fan 36 can continue to operate during the operation of the electrical equipment 10.

Note that the dimension of the gaps $y_1$ and $y_2$ ($=y_1+y_2$) illustrated in FIG. 10 may be set to be larger than the dimension of the gaps $y_3$ and $y_4$ ($=y_3+y_4$) illustrated in FIG. 15. In addition, the dimension of the gaps $z_1$ and $z_2$ ($=z_1+z_2$) illustrated in FIG. 10 may be set to be larger than the dimension of the gap $z_3$ illustrated in FIG. 14.

According to this configuration, even when the casing 38 vibrates in the y-z plane with respect to the housing 16 by a distance corresponding to the gaps $y_3$, $y_4$, and $z_3$, the maximum amplitude of the vibration falls within the movable range of the movable terminal portion 94. Therefore, it is possible to prevent stress from being applied to the movable terminal portion 94 due to the vibration.

Note that the guide hook 79 and the guide hole 24 may be configured such that the gaps $y_3$, $y_4$, and $z_3$ are zero when the fan unit 14 is disposed at the mounting position. In this case, the first portion 81 contacts the end faces 24c and 24d of the guide hole 24, and the second portion 83 contacts the end wall 18.

Figure 17:
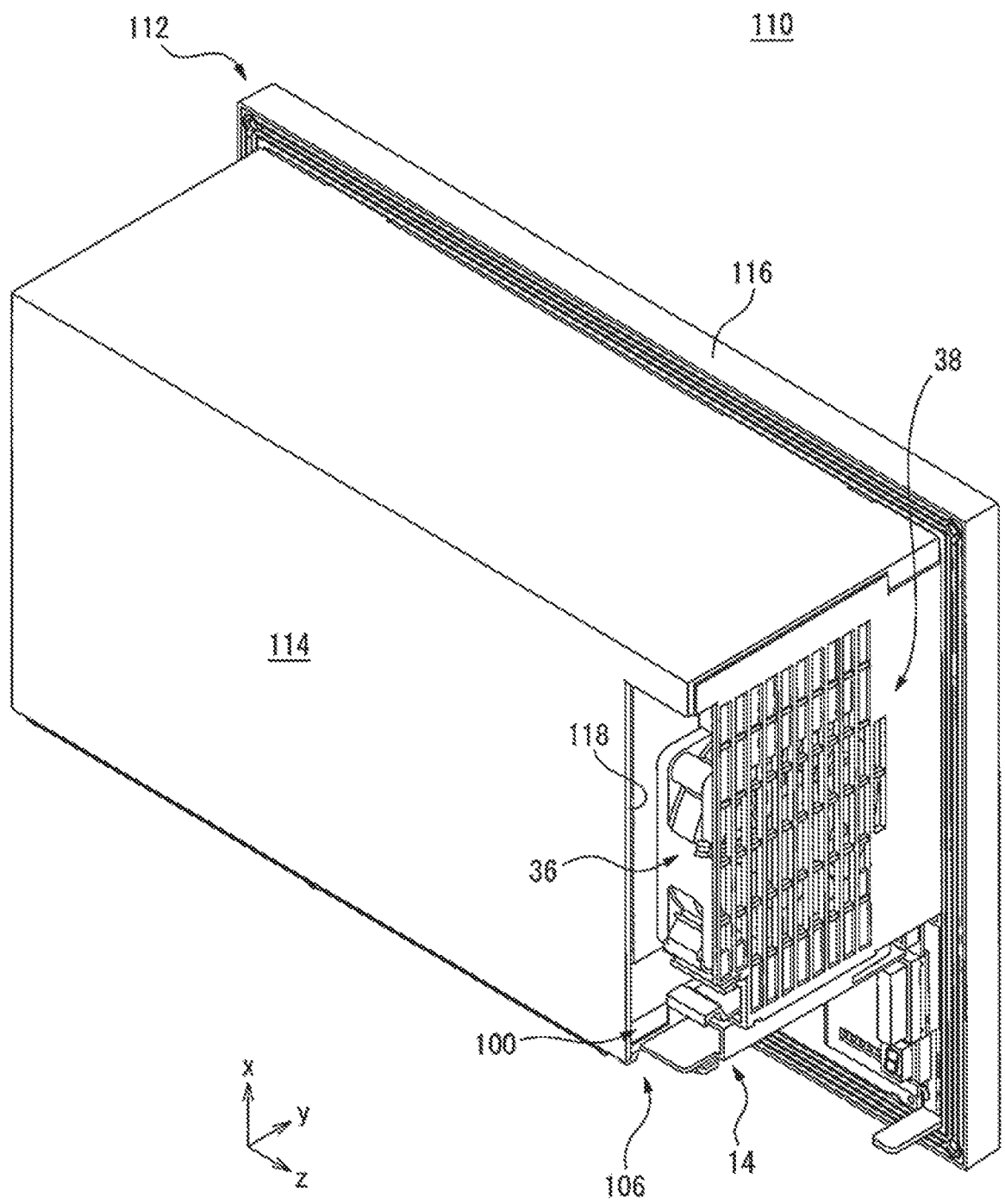
FIG. 17 illustrates an electrical equipment according to another embodiment.
Figure 18:
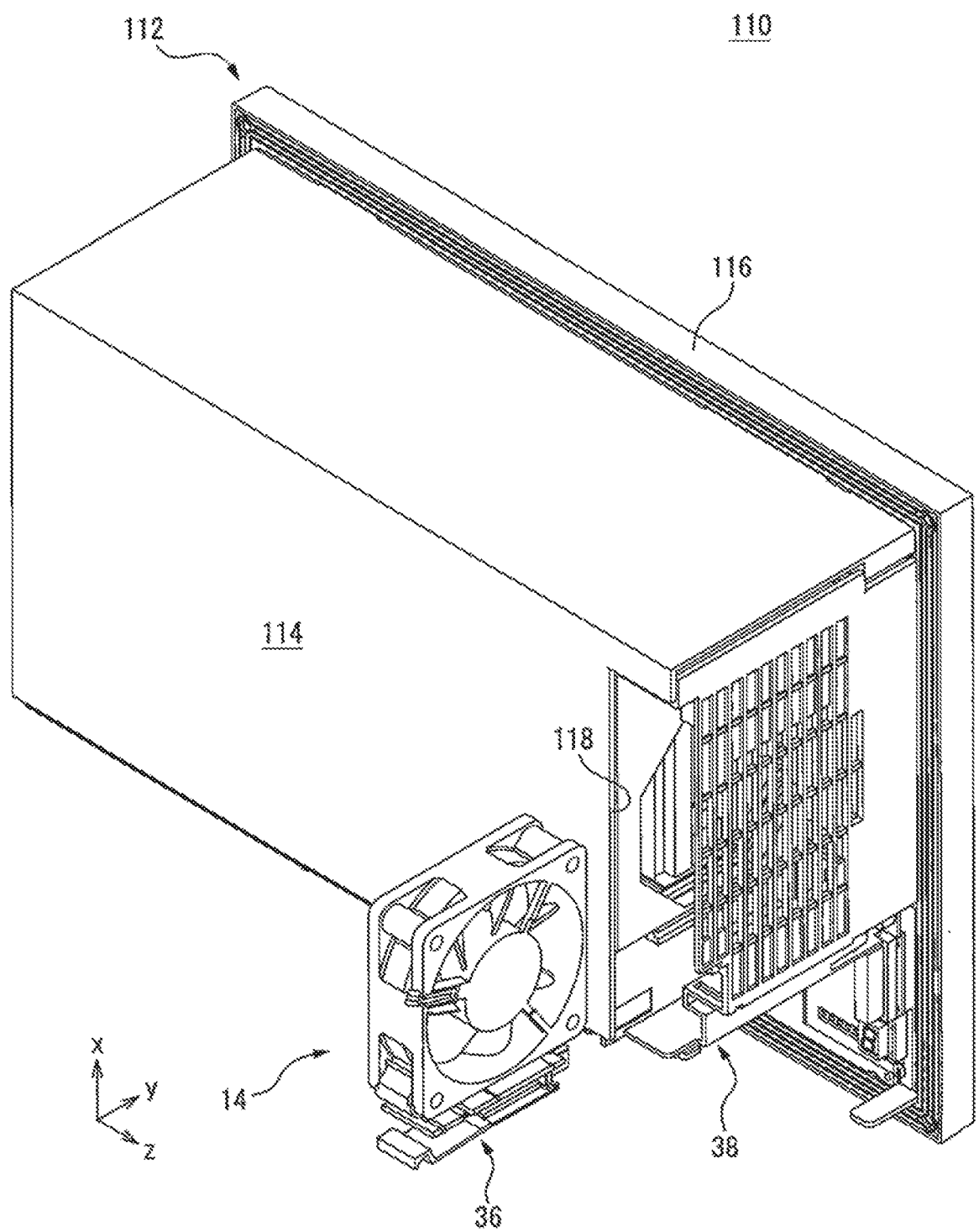
FIG. 18 illustrates a state where a fan of the electrical equipment illustrated in FIG. 17 is removed from a casing.

Next, an electrical equipment 110 according to another embodiment will be described with reference to FIGS. 17 and 18. Similar as the above-described electrical equipment 10, the electrical equipment 110 is a numerical control device that controls a machine tool, or a motor drive device that supplies power to a servomotor provided in a machine tool. The electrical equipment 110 includes a main body 112, the fan unit 14, and the attachment structure 106.

The main body 112 includes a housing 114 and a display device 116 fixed to an end in the y-axis positive direction of the housing 114. The housing 114 is hollow and houses electronic components, similar as the housing 16 described above. The display device 116 includes e.g. an LCD or an organic EL, wherein the operator can view information displayed on the display device 116 from the y-axis positive direction side thereof.

Although not illustrated in the drawings, the above-described guide holes 24 and retaining holes 26 are formed in an end wall 118 in the z-axis positive direction of the housing 114. In a state illustrated in FIG. 17, the guide hooks 79 of the fan unit 14 respectively engage with the guide holes 24 formed in the end wall 118, and the retaining pawl 82 of the fan unit 14 engages with the retaining hole 26 formed in the end wall 118, whereby the movement of the fan unit 14 in the x-axis, y-axis, and z-axis directions is restricted.

Thus, the guide hook 79 of the fan unit 14 and the guide hole 24 of the end wall 118 constitute the guide mechanism 102 of the attachment structure 106, and the retaining pawl 82 of the fan unit 14 and the retaining hole 26 of the end wall 118 constitute the retaining mechanism 104 of the attachment structure 106. By this attachment structure 106, the fan unit 14 can be detachably attached to the housing 114 of the main body 112 in the x-axis direction.

On the other hand, the fan unit 14 includes the above-described second attachment structure 100 by which the operator can detachably attach the fan 36 to the casing 38 in the y-axis direction. This configuration is advantageous when the operator can access the fan unit 14 only from the y-axis negative direction side due to spatial restriction around the electrical equipment 110.

When maintenance (e.g., replacement) of the fan 36 is required, the operator can remove the fan 36 from the casing 38 by pulling the fan 36 out of the casing 38 in the y-axis negative direction, as described above. The operator then attaches a new fan 36 to the casing 38 in the y-axis positive direction. In this way, the operator can easily carry out maintenance of the fan 36 even when the operator can access the fan unit 14 only from the y-axis direction.

As described above, due to the attachment structure 106, the fan unit 14 can be shared between a plurality of the electrical equipments 10 and 110, and maintenance of the fan 36 can be easily carried out in accordance with spatial restriction of the individual electrical equipments 10 and 110. Accordingly, both facilitation of maintenance of the fan 36 and reduction of the number of parts can be realized.

Figure 19:
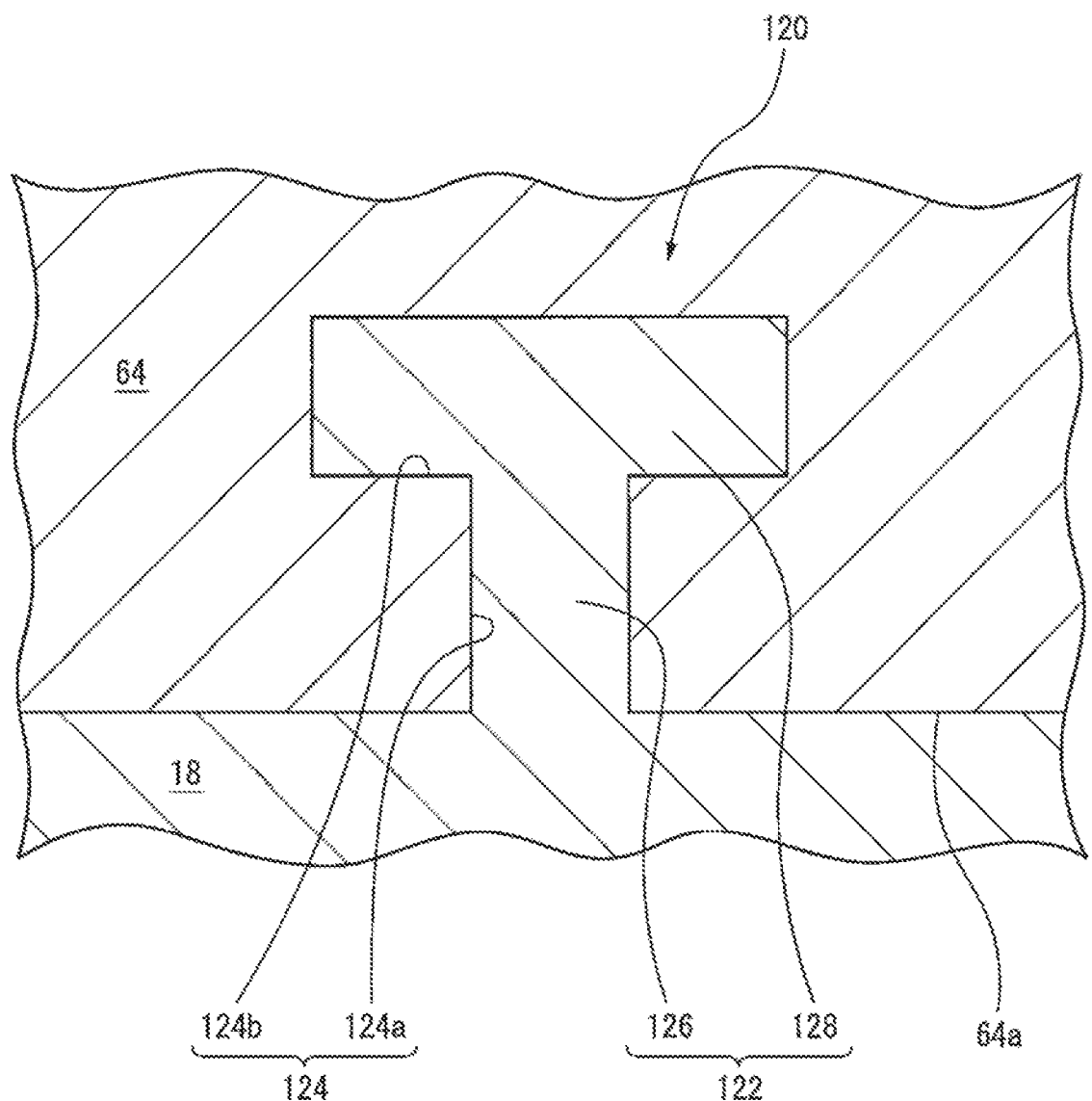
FIG. 19 is a cross-sectional view of a guide mechanism according to another embodiment.

Note that, in the guide mechanism 102 described above, the guide hook 79 may be formed at the end wall 18 of the main body 12, while the guide hole 24 may be formed in the end wall 64 of the casing 38. In addition, there are various modification of the guide mechanism 102. Below, with reference to FIG. 19, a guide mechanism 120 according to another embodiment will be described.

The guide mechanism 120 includes a guide hook 122 provided at the main body 12 and a guide hole 124 provided at the casing 38 of the fan unit 14. The guide hook 122 is formed integrally with the end wall 18 of the housing 16 so as to protrude from the end wall 18 in the z-axis positive direction and linearly extend in the x-axis direction. More specifically, the guide hook 122 includes a base 126 extending from the end wall 18 in the z-axis positive direction, and a collar 128 protruding from an end in the z-axis positive direction of the base 126 to both sides in the y-axis direction.

On the other hand, the guide hole 124 is formed in the end wall 64 of the casing 38 so as to be recessed inward from the surface 64a of the end wall 64. More specifically, the guide hole 124 includes a first hole portion 124a opening at the surface 64a, and a second hole portion 124b connected to an end in the z-axis positive direction of the first hole portion 124a. The second hole portion 124b has a width in the y-axis direction larger than the first hole portion 124a.

When the operator performs the second slide motion, the guide hook 122 is fitted into the guide hole 124 and the second slide motion of the casing 38 relative to the housing 16 in the x-axis positive direction is guided. In addition, due to the engagement between the guide hook 122 and the guide hole 124, disengagement of the guide claw 122 from the guide hole 124 is restricted, and the movement of the fan unit 14 in the y-axis and z-axis directions is restricted.

When the fan unit 14 is disposed at its mounting position, an end face in the x-axis positive direction of the guide claw 122 contact an end face in the x-axis positive direction that defines the guide hole 124 (both not illustrated), whereby the movement of the fan unit 14 in the x-axis positive direction is restricted, while the movement of the fan unit 14 in the x-axis negative direction is also restricted by the above-described retaining mechanism 104. In this way, the movement of the fan unit 14 in the x-axis, y-axis, and z-axis directions is restricted, and the fan unit 14 is fixed to the main body 12. Note that, the guide hook 122 may be formed at the end wall 64 of the casing 38, while the guide hole 124 may be formed in the end wall 18 of the housing 16.

Figure 20:
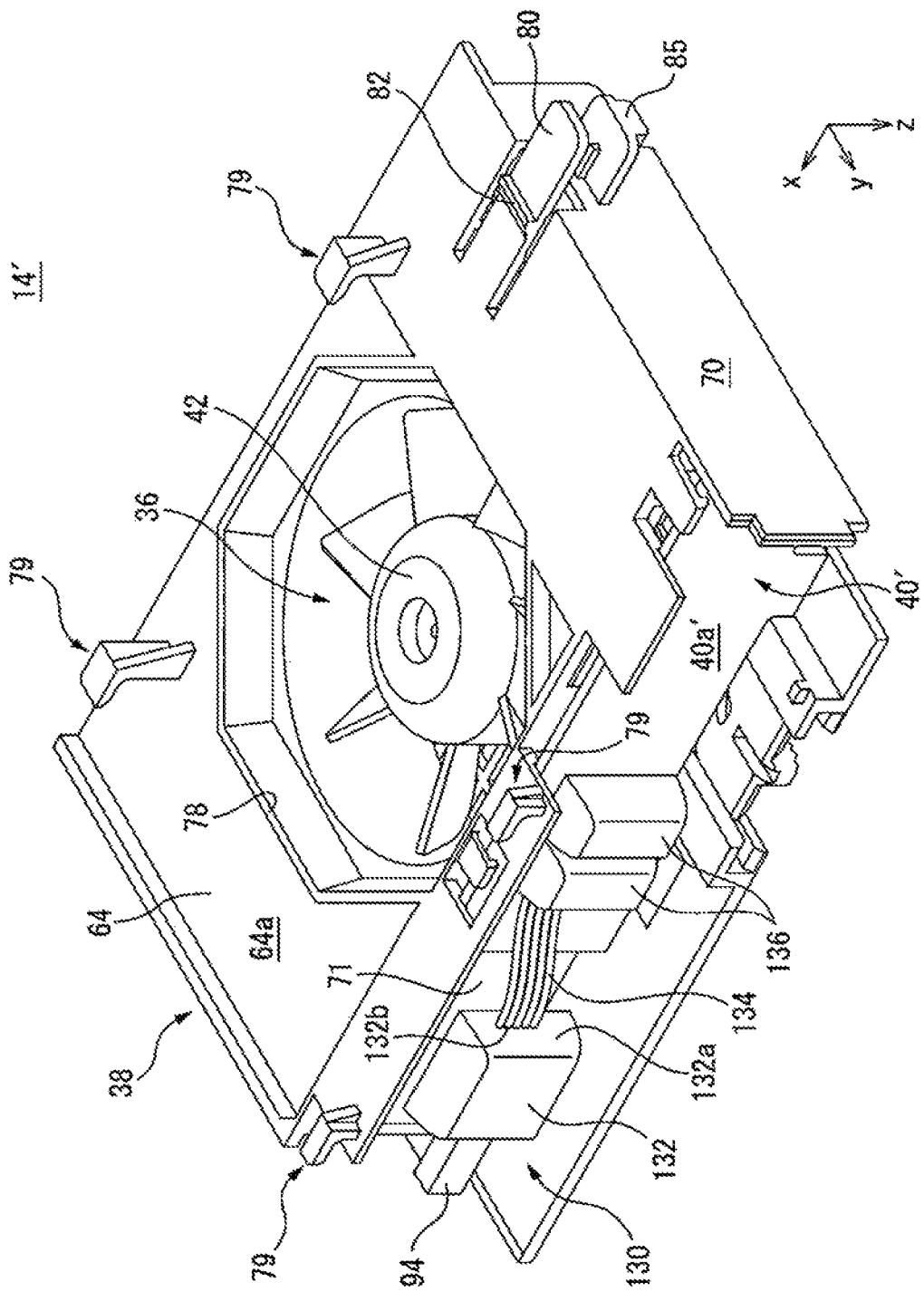
FIG. 20 is a perspective view of a fan unit according to another embodiment.

Note that, in the embodiment described above, the connector 90 is provided on the substrate 40, however the connector 90 may be provided at the casing 38. Such an embodiment will be described with reference to FIG. 20. In a fan unit 14' illustrated in FIG. 20, a connector 130 is fixed to the end wall 71 in the y-axis positive direction of the casing 38.

The connector 130 includes a fixed portion 132 formed integrally with the end wall 71, and the movable terminal portion 94 movably supported inside the fixed portion 132. As illustrated in FIGS. 9 and 10, the fixed portion 132 is formed with the receiving hole 92a in which the movable terminal portion 94 is movably received. The gap xi in the x-axis direction, the gaps $y_1$ and $y_2$ in the y-axis direction, and the gaps $z_1$ and $z_2$ in the z-axis direction are formed between the fixed portion 132 and the movable terminal portion 94.

Referring again to FIG. 20, a signal cable 134 is lead out from the movable terminal portion 94. The signal cable 134 is lead out from the fixed portion 132 through a hole 132b formed in an end wall 132a in the x-axis negative direction of the fixed portion 132, and connected to electrical elements 136 mounted on a surface 40a' of a substrate 40'.

When the operator performs the second slide motion to slide the fan unit 14' in the x-axis positive direction relative to the main body 12, the movable terminal portion 94 of the connector 130 is connected to the connector 22 provided at the main body 12 in the x-axis positive direction. According to the present embodiment, when vibration occurs in the electrical equipment 10 in a state where the connector 130 is connected to the connector 22, it is possible to mitigate stress acting on the movable terminal portion 94, whereby preventing wiring of the movable terminal portion 94 from being disconnected.

Note that the retaining hole 26 and the retaining pawl 82 are not limited to the shapes described above, but may have any shapes that can engage with each other. The retaining hole 26 and the retaining pawl 82 may be circular, elliptical, triangular or the like, as viewed from the z-axis. In addition, a coil spring or a pair of magnets (i.e., magnets having the same pole) that produce magnetic force that repels each other may be applied in place of the biasing portion 86 described above.

In the embodiments described above, the movable terminal portion 94 is supported by the fixed portion 92, 132 so as to be displaceable in the x-axis, y-axis, and z-axis directions. However, the movable terminal portion 94 may be supported by the fixed portion 92 such that the movable terminal portion 94 cannot be displaced in the x-axis direction but can be displaced in a direction intersecting the connection direction (y-axis or z-axis direction). In addition, the electrical equipment 10 or 110 is not limited to the control device or motor drive device, but may be e.g. a desktop or a tablet PC, or any type of electrical equipment including a fan unit.

Although the present disclosure is described above through the embodiments, the embodiments described above are not intended to limit the claimed invention.

The invention claimed is:

1. An attachment structure configured to detachably attach a fan unit to a main body of an electrical equipment, the fan unit including a fan and a casing configured to house the fan, the casing including a first end wall and an opening formed at the first end wall, the main body including a second end wall and a ventilation hole formed at the second end wall, the attachment structure comprising:
a guide mechanism configured to guide a slide motion of the casing in one direction relative to the main body to dispose the casing at a mounting position, the guide mechanism including:
a guide hook provided at one of the first end wall and the second end wall; and
a guide hole provided at the other of the first end wall and the second end wall, and configured to receive the guide hook so as to guide a movement of the guide hook in the one direction during the slide motion; and a retaining mechanism comprising a retaining pawl and a retaining hole, wherein the retaining mechanism is configured to restrict a movement of the casing relative to the main body in a direction opposite the one direction when the casing is disposed at the mounting position by the slide motion, wherein the first end wall and the second end wall face to each other, and the opening and the ventilation hole are in fluid communication with each other when the casing is disposed at the mounting position.

2. The attachment structure of claim 1, wherein the guide hook engages with the other one of the main body and the casing to restrict a disengagement motion of the guide hook from the guide hole, when the casing is disposed at the mounting position by the slide motion.

3. The attachment structure of claim 1, wherein
the retaining pawl is provided at one of the main body and the casing; and
the retaining hole is provided at the other one of the main body and the casing, and configured to engage with the retaining pawl to restrict the movement of the casing in the opposite direction when the casing is disposed at the mounting position.

4. The attachment structure of claim 3, wherein the retaining pawl is provided at the one of the main body and the casing so as to be displaceable between an engagement position at which the retaining pawl engages with the retaining hole and a disengage position at which the retaining pawl disengages from the retaining hole.

5. The attachment structure of claim 1, wherein the fan unit includes a second attachment structure configured to detachably attach the fan to the casing in a direction intersecting the one direction.

6. An electrical equipment comprising:
a main body;
a fan unit detachably attached to the main body; and
an attachment structure configured to detachably attach a fan unit to a main body of the electrical equipment, the fan unit including a fan and a casing configured to house the fan, the casing including a first end wall and an opening formed at the first end wall, the main body including a second end wall and a ventilation hole formed at the second end wall, the attachment structure comprising:
a guide mechanism configured to guide a slide motion of the casing in one direction relative to the main body to dispose the casing at a mounting position, the guide mechanism including:
a guide hook provided at one of the first end wall and the second end wall; and
a guide hole provided at the other of the first end wall and the second end wall, and configured to receive the guide hook so as to guide a movement of the guide hook in the one direction during the slide motion; and
a retaining mechanism comprising a retaining pawl and a retaining hole, wherein the retaining mechanism is configured to restrict a movement of the casing relative to the main body in a direction opposite the one direction when the casing is disposed at the mounting position by the slide motion, wherein the first end wall and the second end wall face to each other, and the opening and the ventilation hole is in fluid communication with each other, when the casing is disposed at the mounting position.

7. The electrical equipment of claim 6, wherein the electrical equipment is a numerical control device configured to control a machine tool, or a motor drive device configured to supply power to a servomotor provided in a machine tool.

* * * * *